US012076287B2

(12) United States Patent
Powell

(10) Patent No.: US 12,076,287 B2
(45) Date of Patent: Sep. 3, 2024

(54) HUMAN FLOOR LIFT

(71) Applicant: IndeeLift Inc., Livermore, CA (US)

(72) Inventor: Steven Jay Powell, Livermore, CA (US)

(73) Assignee: IndeeLift Inc., Livermore, CA (US)

( * ) Notice: Subject to any disclaimer, the term of this patent is extended or adjusted under 35 U.S.C. 154(b) by 124 days.

(21) Appl. No.: 17/826,582

(22) Filed: May 27, 2022

(65) Prior Publication Data

US 2022/0395413 A1 Dec. 15, 2022

Related U.S. Application Data

(60) Provisional application No. 63/209,849, filed on Jun. 11, 2021.

(51) Int. Cl.
*A61G 7/10* (2006.01)
*A61G 5/14* (2006.01)

(52) U.S. Cl.
CPC ............. *A61G 7/1059* (2013.01); *A61G 5/14* (2013.01); *A61G 7/1011* (2013.01); *A61G 7/1013* (2013.01); *A61G 7/1019* (2013.01)

(58) Field of Classification Search
CPC ...... A61G 7/1059; A61G 5/14; A61G 7/1011; A61G 7/1019
See application file for complete search history.

(56) References Cited

U.S. PATENT DOCUMENTS 3,310,816 A 3/1967 James
4,633,538 A 1/1987 James
(Continued)

FOREIGN PATENT DOCUMENTS

EP 1103242 2/2009
GB 2463960 4/2010
(Continued)

OTHER PUBLICATIONS

Camel—Patient Lifting Cushion (700lbs+), Oak Pointe Medical Products, LLC; https://www.youtube.com/watch?v=7eZ5K7H_MjM, uploaded Mar. 18, 2008.
(Continued)

*Primary Examiner* — David R Dunn
*Assistant Examiner* — Tania Abraham
(74) *Attorney, Agent, or Firm* — Van Pelt, Yi & James LLP

(57) ABSTRACT

A human lift apparatus is disclosed. In various embodiments, the lift apparatus includes a substantially vertical guide rail; a carriage positioned to be moved up and down along the guide rail; a drive mechanism coupled to the carriage and configured to move the carriage at a controlled rate along the guide rail; and a tiltable seat coupled mechanically to the carriage in a manner that allows the seat to tilt about a substantially transverse tilt axis that is substantially parallel to the floor and runs substantially across the seat at a depth that enables a human subject to be seated on the tiltable seat with the center of gravity of the human subject being between the tilt axis and a back end of the seat. The tiltable seat is tiltably mounted in a manner and location that allows the tiltable seat to tilt down, with a front edge of the seat lower than the back edge of the seat, as the center of gravity of the human subject is shifted to a position forward of the tilt axis.

15 Claims, 18 Drawing Sheets

(56) References Cited

U.S. PATENT DOCUMENTS

| | | | | |
|---|---|---|---|---|
| 4,669,943 | A | 6/1987 | Zamotin | |
| 5,265,689 | A | 11/1993 | Kauffmann | |
| 5,432,961 | A | 7/1995 | Horton | |
| 5,875,501 | A | 3/1999 | Jury | |
| 6,941,595 | B1 | 9/2005 | Michael | |
| 7,611,203 | B1 | 11/2009 | Roberts | |
| 8,024,824 | B1 | 9/2011 | Westermann | |
| 8,777,238 | B1 | 7/2014 | Blackwood | |
| 10,639,220 | B1 | 5/2020 | Smith | |
| 2003/0011228 | A1 * | 1/2003 | Komura | A61G 7/1074 297/344.12 |
| 2003/0112147 | A1 | 6/2003 | George | |
| 2004/0075237 | A1 | 4/2004 | Beck | |
| 2007/0067905 | A1 | 3/2007 | Wilder | |
| 2008/0296947 | A1 * | 12/2008 | Galumbeck | A61G 5/14 297/326 |
| 2011/0101748 | A1 * | 5/2011 | Goetz | A47C 3/36 297/284.4 |
| 2011/0187169 | A1 | 8/2011 | Stewart | |
| 2012/0104818 | A1 | 5/2012 | Morris | |
| 2013/0020779 | A1 * | 1/2013 | Green | A61G 5/125 280/200 |
| 2014/0137323 | A1 | 5/2014 | Fernie | |
| 2015/0035333 | A1 | 2/2015 | Schy | |
| 2015/0351985 | A1 | 12/2015 | Powell, Sr. | |
| 2018/0085269 | A1 * | 3/2018 | Powell, Sr. | A61G 7/1015 |

FOREIGN PATENT DOCUMENTS

| | | |
|---|---|---|
| WO | 0047154 | 8/2000 |
| WO | 2000047154 | 8/2000 |

OTHER PUBLICATIONS

How to Use a Hoyer Lift. pp. 1-6. Retrieved from http://www.phc-online.com/How_to_use_Hoyer-Lift_a/146.htm, Oct. 2013.

Hoyer (R) Power Patient Lifters P-C_HLA-2 & HPL402, User Instruction Manual & Warranty. Distributed by Sunrise Medical Inc., 2001.

Patient Lifting Systems from Mangar and Oak Pointe Medical Enterprises Now Offered by Rehabmart.com, PRWeb Online Visibility from Vocus., pp. 1-3, Aug. 30, 2012.

RoMedic StandUp Lift Chair: https://www.youtube.com/watch?v=_zW8ZnFFpkE, uploaded May 1, 2014.

Using a Hoyer Lift, CAREGIVERSSTRAININGVIDEOS.com, https://www.youtube.com/watch?v=DinUBHOBIWU, uploaded Jan. 17, 2011.

* cited by examiner

HUMAN FLOOR LIFT

CROSS REFERENCE TO OTHER APPLICATIONS

This application claims priority to U.S. Provisional Patent Application No. 63/209,849 entitled HUMAN FLOOR LIFT filed Jun. 11, 2021, which is incorporated herein by reference for all purposes.

BACKGROUND OF THE INVENTION

Lift devices have been disclosed to assist a human from a floor to a seated height and position. However, some users may desire or need to be lifted from the floor, a seated position, or some other height or position to a standing height and/or position. Existing solutions, such as recliners and other chairs, to raise a person to a standing position involve scissor-type mechanisms and/or hydraulics that raise the seat and/or seat back up and forward, which can result in instability and/or falling for some patients.

BRIEF DESCRIPTION OF THE DRAWINGS

Various embodiments of the invention are disclosed in the following detailed description and the accompanying drawings.

DETAILED DESCRIPTION

Figure 1A:
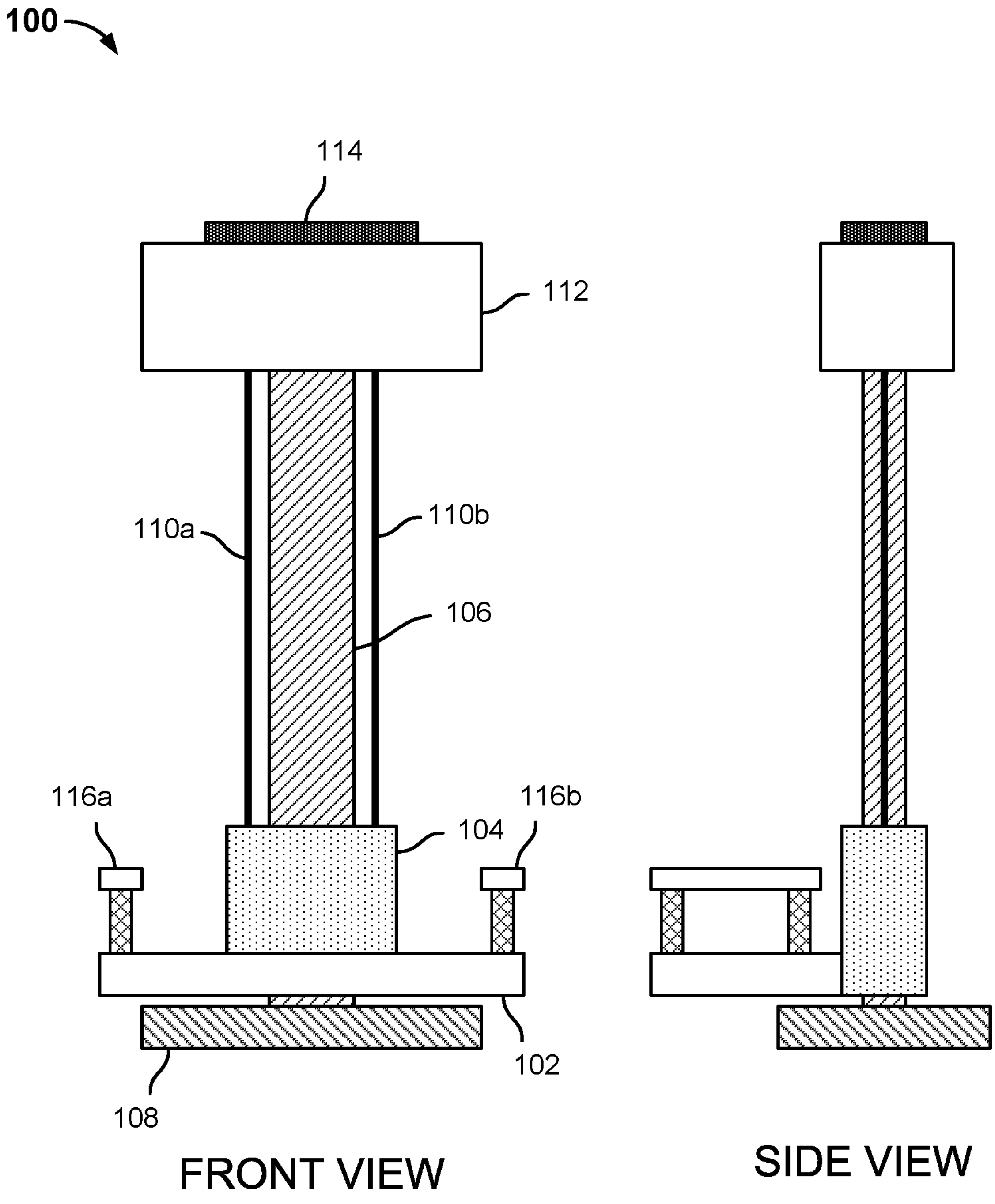
FIG. 1A is a block diagram illustrating an embodiment of a lift apparatus with the seat in a lowered position.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to provide a human floor lift capable, in various embodiments, of doing one or more of the following: lifting a human from the floor to a seated height and position; lifting a human from the floor to a near-standing height or other height or position from which the person is able to stand; and lifting a human from a seated height, bed height, or other non-standing height above the floor to a near-standing height or other height or position from which the person is able to stand.

A self or assistant operated human floor lift is disclosed in U.S. Pat. No. 9,808,388, entitled SELF OR ASSIST-OPERATED HUMAN FLOOR LIFT, issued Nov. 7, 2017, (the '388 patent), which is incorporated herein by reference for all purposes.

In various embodiments, a human floor lift as disclosed herein includes a seat and lifting mechanisms as in the '388 patent but is adapted to be raised to a height associated with standing, such as a height above a typical ADA or non-ADA seat height, from which a user may be able to stand. In some embodiments, the lift includes a mechanism to allow the seat to tilt or tip forward, in a controlled or dampened manner, as the seat raises above the seated height, with the user's feet on the floor, allowing the user to slide forward and off of the seat and transition to the standing position as the lifting mechanism, attached at the back of the seat as in the ’388 patent, continues to rise above the seated height.

Human Floor Lift

FIG. 1A is a block diagram illustrating an embodiment of a lift apparatus with the seat in a lowered position. In the example shown, the lift apparatus 100 includes a seat 102, shown in a lowered position, near the floor. The seat 102 in various embodiments may be constructed using a rigid material, such as molded plastic, sheet metal, wood, rigid composite materials, etc. In various embodiments, the lift seat may be fixed or retractable (fold up) and engineered to support a human payload of any weight with basic implementation for up to 300 pounds and heavy duty implementation to 600 pounds and larger and includes a seat with dimensions that comply with ADA specifications as defined in the ADA standard for Benches, Toilets, and other compliant seating mechanisms. In some embodiments, the seat 102 may be 16 to 26 inches wide and/or 10 to 24 inches deep.

The seat 102 is attached fixedly to a linear bearing 104. Linear bearing 104 is mounted movably on a vertical rail 106. As used herein, the term “linear bearing” refers broadly to an element configured to bear a load through movement along a longitudinal axis of a rail, guide, or similar linear path and/or structure. Vertical rail 106 may be any suitable material capable to bearing the required load, e.g., extruded aluminum. Vertical rail 106 is mounted fixedly in a baseplate 108. In some embodiments, baseplate 108 may comprise a flange with bolt holes to enable the lift apparatus 108 to be bolted to the floor, e.g., along or near a wall to which the lift apparatus 100 may be mounted. Cables 110*a* and 110*b* are attached to linear bearing 104, to enable linear bear 104 and components affixed thereto to be raised and/or lowered along vertical rail 106.

A drive assembly 112 is provided to raise and/or lower the linear bearing 104 and the seat 102 attached thereto. In various embodiments, drive assembly 112 includes a power supply, such as a rechargeable battery, and one or more motors configured to rotate one or more drums in a first rotational direction to wind cables 110*a* and 110*b* onto said drum(s), thereby causing the linear bearing 104 and seat 102 to be raised and/or in a second rotational direction to allow cables 110*a* and 110*b* to unwind from said drum(s), thereby allowing the linear bearing 104 and seat 102 to be lowered. In the example shown, a solar cell/array 114 is disposed on a top surface of drive assembly 112. In various embodiments, solar cell/array 114 converts ambient (e.g., indoor) light to electric current sufficient to (re)charge one or more rechargeable batteries comprising the drive assembly 112.

The seat 102 has attached thereto a pair of arm rests 116*a* and 116*b*. In various embodiments, arm rests 116*a* and 116*b* may serve to make it more comfortable for a person to be seated on seat 102 and/or may help to prevent an accidental fall off of seat 102. In various embodiments, the arm rests 116*a* and 116*b* are affixed to seat 102 in a manner that makes it possible to readily remove them and/or move them out of the way while a person gets onto seat 102. For example, in some embodiments, the arm rests 116*a* and 116*b* are removable. For example, the arm rests 116*a* and 116*b* may slide into recesses in seat 102 and may be removed by pulling the arm rests up and out of the recesses. Alternatively, the arm rests 116*a* and 116*b* may be configured to fold down and out to the sides of seat 102, and/or to swing out and away from the sides of seat 102, e.g., around a rear post or other attachment point towards the rear of seat 102, i.e., a point nearest to vertical rail 106. In some embodiments, arm rests 116*a* and 116*b* may be pulled out and/or pushed in along an axis substantially parallel to a front edge of the seat 102, e.g., to make the space available to receive a person wider and/or narrower as needed.

Figure 1B:
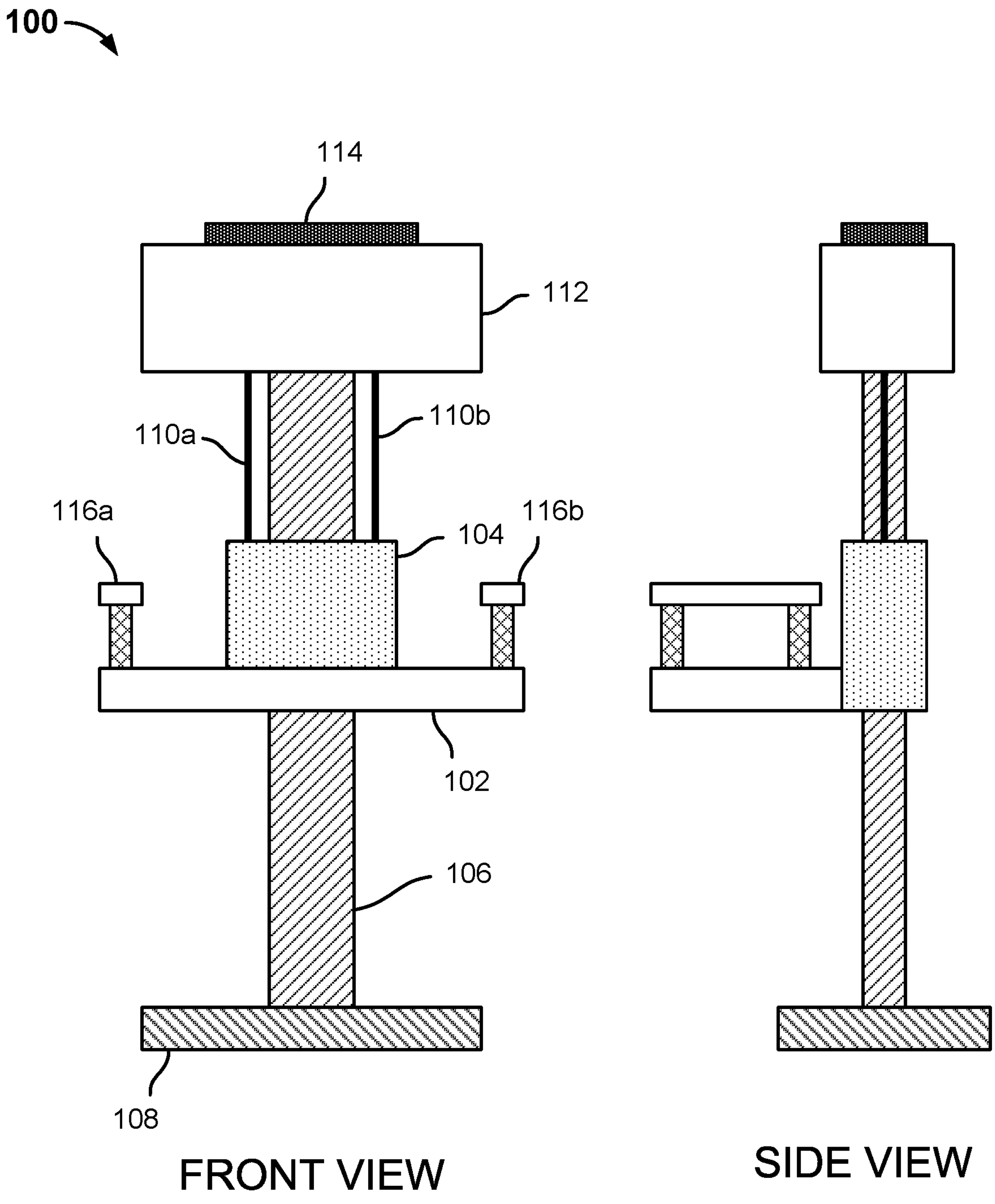
FIG. 1B is a block diagram illustrating an embodiment of a lift apparatus with the seat in a raised position.

FIG. 1B is a block diagram illustrating an embodiment of a lift apparatus with the seat in a raised position. In the example shown, the seat assembly, i.e., seat 102, linear bearing 104, and arm rests 116*a* and 116*b*, of lift apparatus 100 has been raised. In various embodiments, the linear bearing 104 and elements affixed thereto may have been raised to the position shown by actuating the drive assembly 112 to reel in the cables 110*a* and 110*b*, thereby causing the linear bearing 104 and elements affixed thereto (seat 102 and arm rests 116*a* and 116*b*, in this example) to travel upward along vertical rail 106 to the position shown.

In some embodiments, the lift apparatus 100 may be configured, e.g. via control electronics, electromechanical control mechanisms, etc., to raise the seat 102 from a position near the floor (e.g., 1 to 3 inches above the floor) to a position 17 to 19 inches above the floor. In various embodiments, arm rests 116*a* and 116*b* may be sized and located relative to seat 102 in such a way as to provide leverage to help a person to stand up once the seat 102 has been raised to a position 17 to 19 inches above the floor (16 to 20 inches in some embodiments).

In various embodiments, the lift apparatus 100 is designed to allow a human positioned on the floor to shimmy backwards, with or without help, on to the seat within 2 inches of the floor utilizing a diagonal mounting ramp that allows the smooth transitional slide from ⅛-⅜ inches from the floor to the seat level without a requirement to lift the human vertically, and grab the hand rails (e.g., arm rests 116*a* and 116*b*) and depress the lift switch or other activation mechanism (i.e. remote control or voice activation) and travel at a rate of speed, e.g., between 1 inch and 4 inches per second, to a position above the floor where the lift stops, allowing the individual to stand from a vertical sitting position. For example 16" to 19" from the floor as defined in the ADA seating.

The lift apparatus 100 is designed in some embodiments to allow the transfer from a wheelchair, commode, or other sitting fixture or device positioned 16 to 20 inches from the floor to a position within two inches from the floor.

In various embodiments, a motor or other mechanism in drive assembly 112 allows the seat assembly to descend under the force of gravity with the speed of descent being limited to remain within a design range of speeds and/or within a design maximum speed by an upward restraining force applied as needed to the cables 110*a* and 110*b*. In some embodiments, there is no downward pressure except the result of gravity, i.e., one cannot be crushed between the lowering seat and the baseplate/ground. In some embodiments, the weight of the seat (e.g., 15 to 26 pounds) plus the load on the seat equal the maximum downward force, for safety reasons. In some embodiments, the speed of descent may be controlled by limiting the motor to a design maximum speed of rotation. In some embodiments, the design maximum speed of descent/ascent is 13.75 feet per minute. In various embodiments, a design maximum speed in the range of 8 feet per minute to 20 feet per minute may be used.

Figure 2:
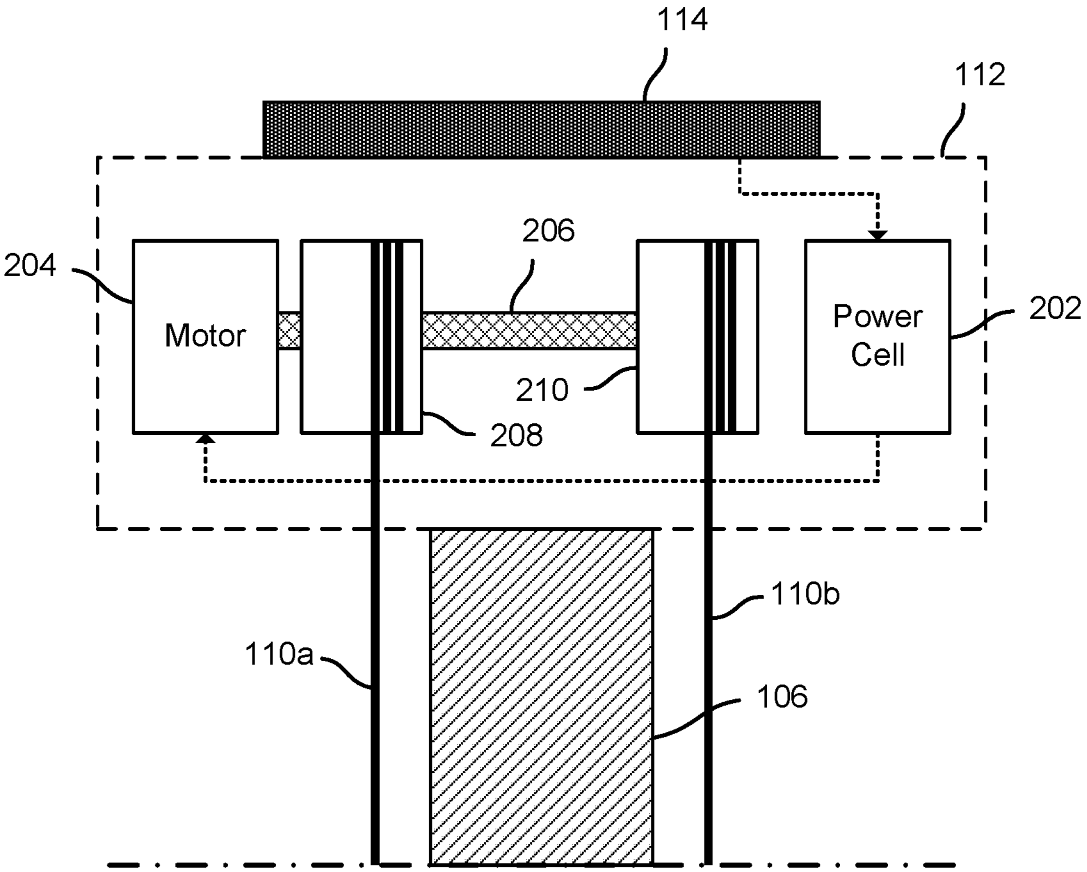
FIG. 2 is a block diagram illustrating an embodiment of a drive assembly portion of a lift apparatus.

FIG. 2 is a block diagram illustrating an embodiment of a drive assembly portion of a lift apparatus. In the example shown, the drive assembly 112 of the lift apparatus 100 of FIGS. 1A and 1B is shown to include in various embodiments a power cell (e.g., rechargeable battery) 202 configured to be recharged by solar cell(s) 114 and to provide power to drive an electric motor 204. The motor 204 rotates a shaft 206 to which drums 208 and 210 are coupled mechanically. In some embodiments, the motor 204 may be coupled to the shaft 206 and/or shaft 206 may be coupled to drums 208 and 210 by a reduction gear or other power transmission mechanism not shown in FIG. 2.

In various embodiments, the lift mechanism can be designed with a number of mechanical approaches including, by way of example and without limitation, cable driven winch (as shown in FIG. 2), motorized lead screw, or electric/hydraulic. The Lift mechanism can be engineered to provide service for multiple classes of device from lightweight residential to heavy-duty commercial versions depending on specific product implementations. The lift stroke is from within 2 inches from the floor to 17 to 19 inches above the floor for a total stroke of between 15 and 19 inches. The stroke parameter may be adjusted up or down for customized implementations supporting an unknown number of human sizes and/or physical anomalies.

The drive assembly 112 includes in some embodiments a 12V DC motor 204 rated between 750 and 2000 pounds, high-torque, and low voltage with an integrated reduction gear with a ratio of 153:1 and a customized drum designed (208, 210) for an output speed of 13.75 feet per minute (2.75 inches per second).

Figure 3:
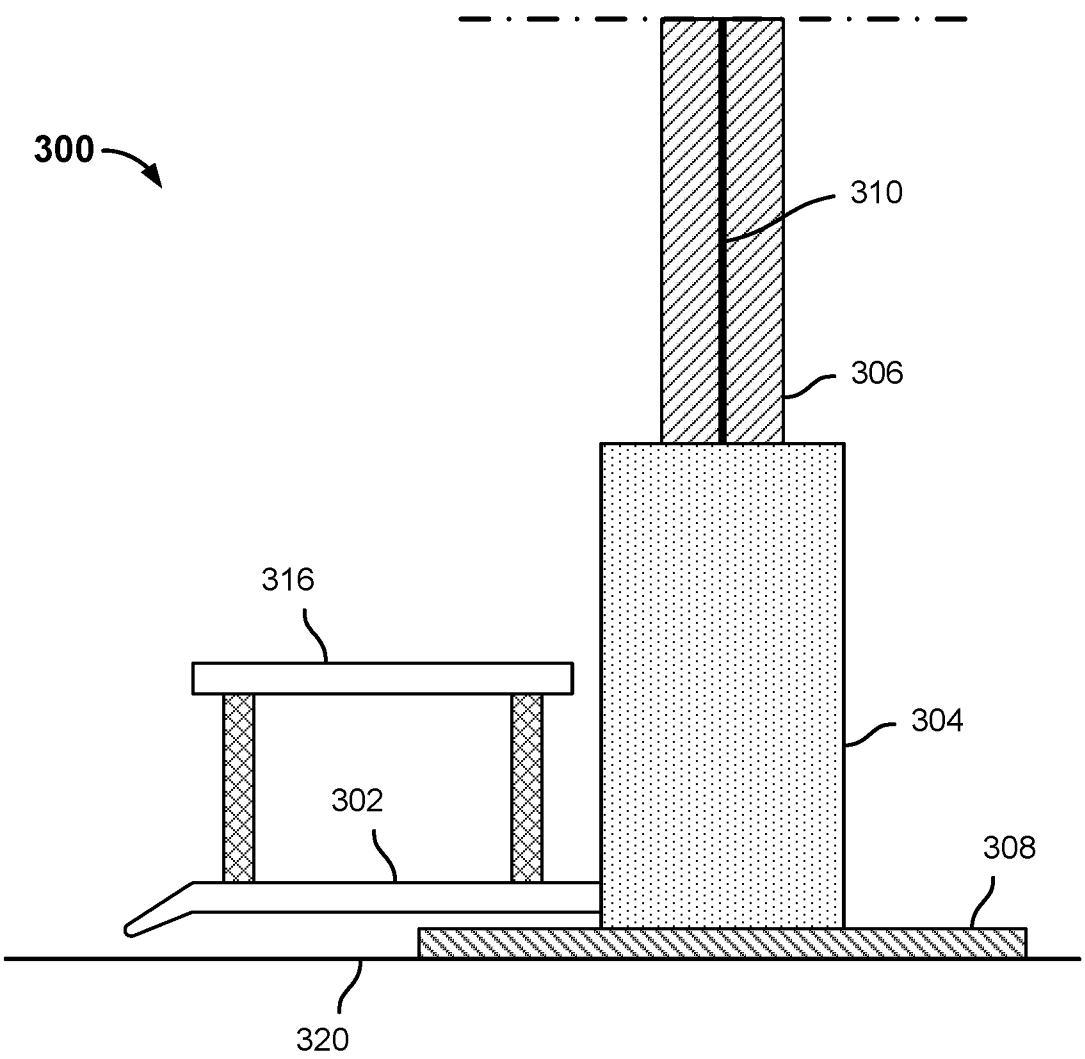
FIG. 3 is a block diagram illustrating an embodiment of a seat assembly portion of a lift apparatus.

FIG. 3 is a block diagram illustrating an embodiment of a seat assembly portion of a lift apparatus. In the example shown, the lift apparatus 300 includes a seat 302 affixed to a linear bearing 304 configured to be raised or lowered along a vertical rail 306 affixed to a baseplate 308 by reeling in (to raise) or paying out (to lower) cables 310 attached to linear bearing 304. The seat 302 has (optionally removable and/or movable) arm rests 316 attached thereto. The lift apparatus 300 is shown in a lowered position, with the seat 302 very near (e.g., within 1 to 3 inches) of the floor 320 on which the apparatus 300 is shown to be resting and/or installed. In the example shown, the seat 302 has a front lip portion that bends down toward the floor 320. In various embodiments, the seat 302 may be constructed of sheet metal or other rigid material that is capable of being formed and/or deformed during manufacturing to create a front lip portion, as in the example shown. In various embodiments, the front lip portion of the seat 302 may be of a size (e.g., length/depth) and/or shape (e.g., angle, front edge shape) designed to facilitate the (potentially) unassisted mounting of the seat by a person from a position on floor 320 that is adjacent to the seat 302. For example, in various embodiments, the front lip portion may extend to within an inch of the floor 320 and may enable a person to more readily shimmy up and onto the seat 302, enabling the person to be raised to a raised position as described herein (see, e.g., FIG. 1B).

Figure 4:
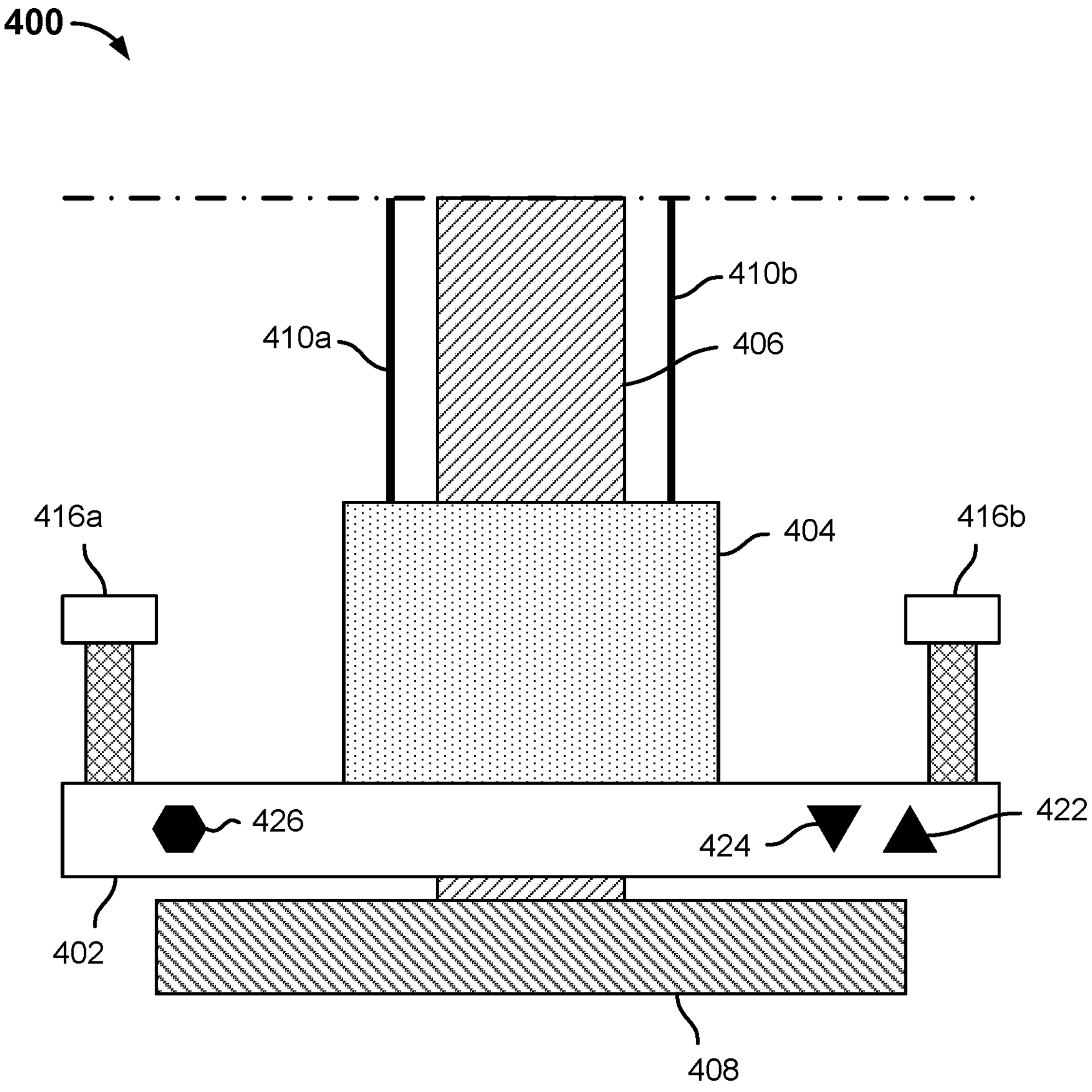
FIG. 4 is a block diagram illustrating an embodiment of a lift apparatus seat assembly in which user controls have been integrated.

FIG. 4 is a block diagram illustrating an embodiment of a lift apparatus seat assembly in which user controls have been integrated. In the example shown, a seat assembly portion of a lift apparatus 400 is shown in a lowered position. The lift apparatus 400 includes a seat 402 affixed to a linear bearing 404 configured to be raised or lowered along a vertical rail 406 affixed to a baseplate 408 by reeling in (to raise) or paying out (to lower) cables 410*a* and 410*b* attached to linear bearing 404. The seat 402 has (optionally removable and/or movable) arm rests 416*a* and 416*b* attached thereto. In the example shown, the seat 402 has operator controls 422, 424, and 426 integrated therein. Specifically, in this example the controls include an up button 422 to which the lift apparatus 400 is responsive to raise the seat 402; a down button 424 to which the lift apparatus 400 is responsive to lower the seat 402; and an emergency stop button 426 to which the lift apparatus 400 is responsive to stop and lock the seat 402 in position. In various embodiments, more or fewer controls may be provided. In some embodiments, controls such as buttons 422, 424, and/or 426 may be provided in addition and/or instead on a remote control or other handheld control device. For example, a remote control device may be provided and may be configured to rest in a pocket or other receptacle that is integrated with, attached to, magnetically adhered, and/or otherwise mounted on or nearby the lift apparatus 400 and/or seat 402. In some embodiments, voice activation may be provided.

In some embodiments, remote activation capability may be provided, e.g., via a networked computer, mobile device, or other remote device. A camera or other imaging device may be mounted in a patient or family member's room, for example, to enable a remote operator, family member, or other remote assistant to safely operate the lift once a patient or family member has moved themselves onto the lowered seat of the lift apparatus, for example.

Figure 5A:
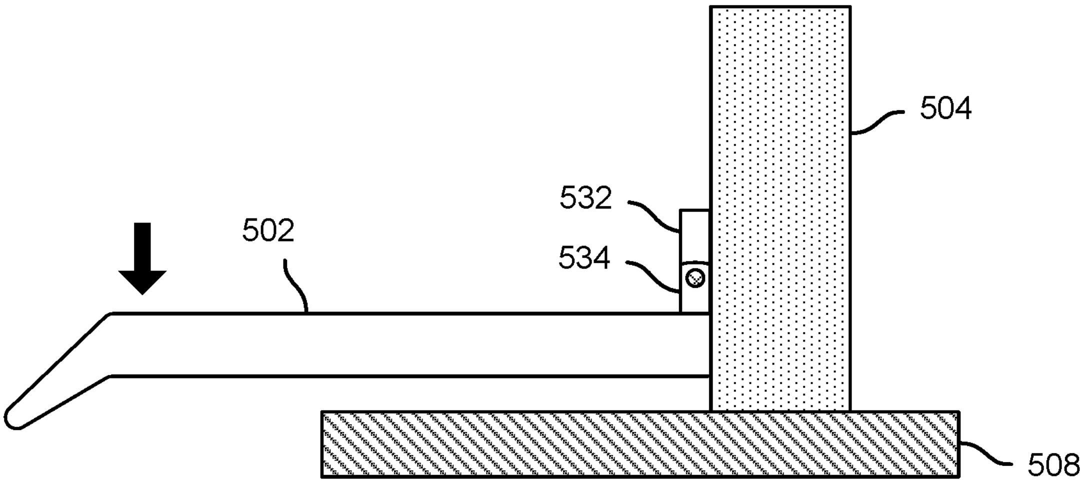
FIG. 5A is a block diagram illustrating an embodiment of a lift apparatus seat assembly in a deployed position.

FIG. 5A is a block diagram illustrating an embodiment of a lift apparatus seat assembly in a deployed position. In the example shown, seat 500 is attached to linear bearing 504 (which rides on a vertical rail that is not shown, e.g., attached to baseplate 508) by a spring or weight loaded hinge that includes a first portion 532 that is attached fixedly (e.g., screwed, bolted, glued, welded, etc.) to the linear bearing 504 and a second portion 534 attached fixedly to seat 502. In at least the deployed (seat 502 down and parallel to the floor) position shown, in various embodiments second hinge portion 534 is under a spring force that tends to rotate the second hinge portion 534 clockwise (when viewed from the side shown in FIG. 5A) relative to the first hinge portion 532, e.g., around a hinge pin or other axial member(s). In the position shown in FIG. 5A, a force represented by the large black arrow has been applied to rotate the seat 502 into the deployed position shown. For example, a user may have used his/her hand to pull the seat down into the position shown, and/or may be using his/her body weight to hold the seat 502 down, e.g., to enable the user to slide up and onto the seat 502.

Figure 5B:
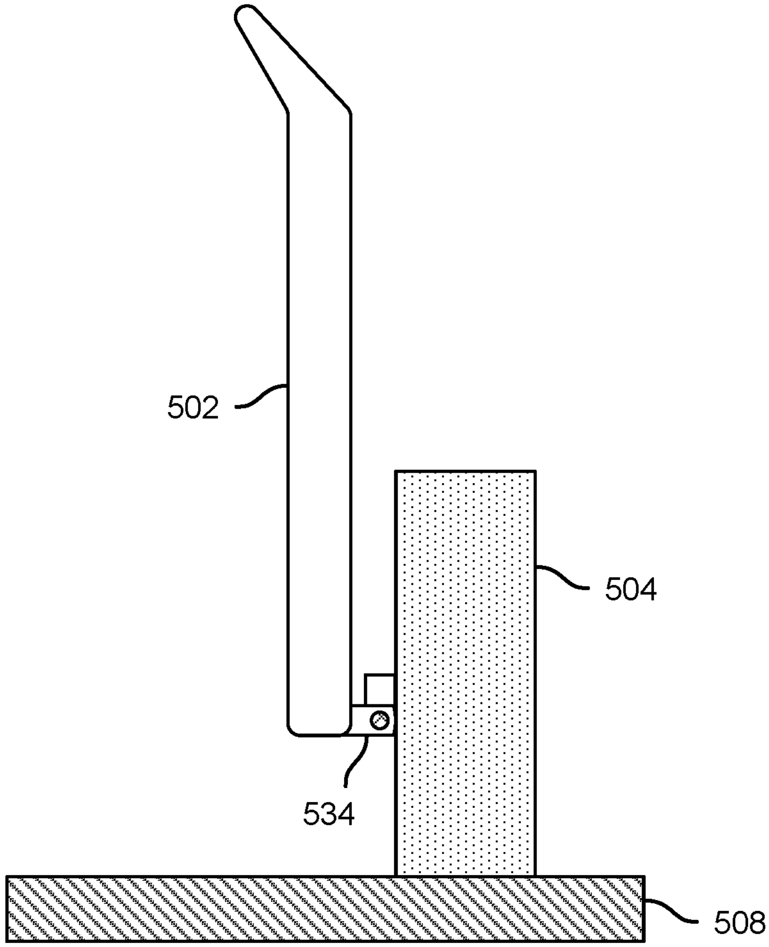
FIG. 5B is a block diagram illustrating an embodiment of a lift apparatus seat assembly in a stowed position.

FIG. 5B is a block diagram illustrating an embodiment of a lift apparatus seat assembly in a stowed position. In the example shown, the force holding the seat 502 down in the deployed position, as shown in FIG. 5A, has been removed, resulting in the seat 502 being rotated up into the stowed position as shown in FIG. 5B. Specifically, in this example the spring or weighted tension in the hinge comprising hinge portions 532 and 534 has caused the second hinge portion 534 to rotate to the position shown, which has resulted in the seat 502 being rotated up and into the stowed position as shown in FIG. 5B. In various embodiments, any mechanism that would cause the seat 502 to move to and remain in the stowed position shown in FIG. 5B when force is not applied to the seat may be used.

Figure 6:
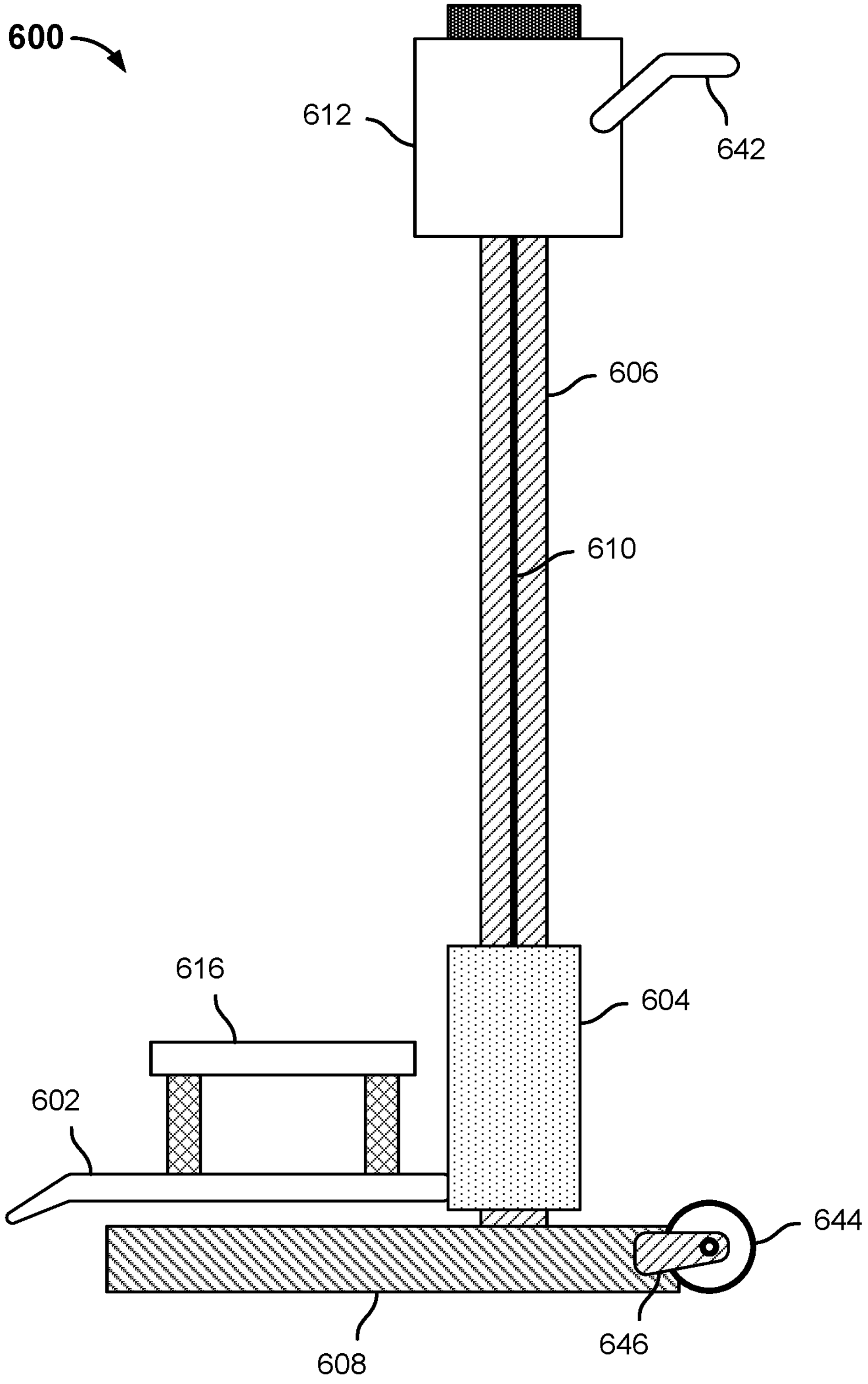
FIG. 6 is a block diagram illustrating an embodiment of a portable lift apparatus.

FIG. 6 is a block diagram illustrating an embodiment of a portable lift apparatus. In the example shown, lift apparatus 600 includes a seat 602 affixed to a linear bearing 604 configured to be raised or lowered along a vertical rail 606 affixed to a moveable baseplate 608 by reeling in (to raise) or paying out (to lower) cables 610 attached to linear bearing 604 on opposite sides of vertical rail 606. Actuation is provided by a drive assembly 612. The seat 602 has arm rests 616 attached thereto. A handle 642 is mounted on a housing of drive assembly 612. A wheel 644 is mounted on opposite sides of a back end of baseplate 608 by mounting brackets/flanges 646. The handle 642, wheels 644, and brackets/flanges 646 are designed to enable the lift apparatus 600 to be rocked back onto the wheels 644, e.g., by pulling back on handle 642 while using one's foot to prevent the baseplate 608 from slide or rolling backwards once the weight of the lift apparatus 600 begins to shift onto the wheels 644. Once the lift apparatus 600 has been rocked back onto the wheels 644, such that the weight of the lift apparatus 600 is balanced on the wheels 644 and baseplate 608 has been lifted fully (or at least sufficiently) clear of the floor, in various embodiments the handle 642 may be used to steer and roll the lift apparatus 600 to a desired location.

For example, in one use case, the lift apparatus 600 may be rolled to a position at the side of a bed, a chair, a wheel chair, etc. The seat 602 may be raised in such a use example to a height at or near the same height as a surface from which a patient or other human subject is to be transferred onto the seat 602 of lift apparatus 600. Once the subject has been transferred onto seat 602, in various embodiments, the subject may be strapped into the seat, e.g., using a seat belt of similar device (not shown) and the portable lift 600 may be moved to a destination in the same manner, e.g., rocked back onto wheels 644 and rolled to the destination. Alternatively, once the subject has been lifted, the subject may be transferred to a wheel chair or other transport equipment. Once at the destination, or at the original location, the seat 602 of lift apparatus 600 may be lowered to the floor to enable the person seated in the lift apparatus 600 to be transferred safely to the floor, e.g., to perform floor-based physical therapy or other activities.

Figure 7A:
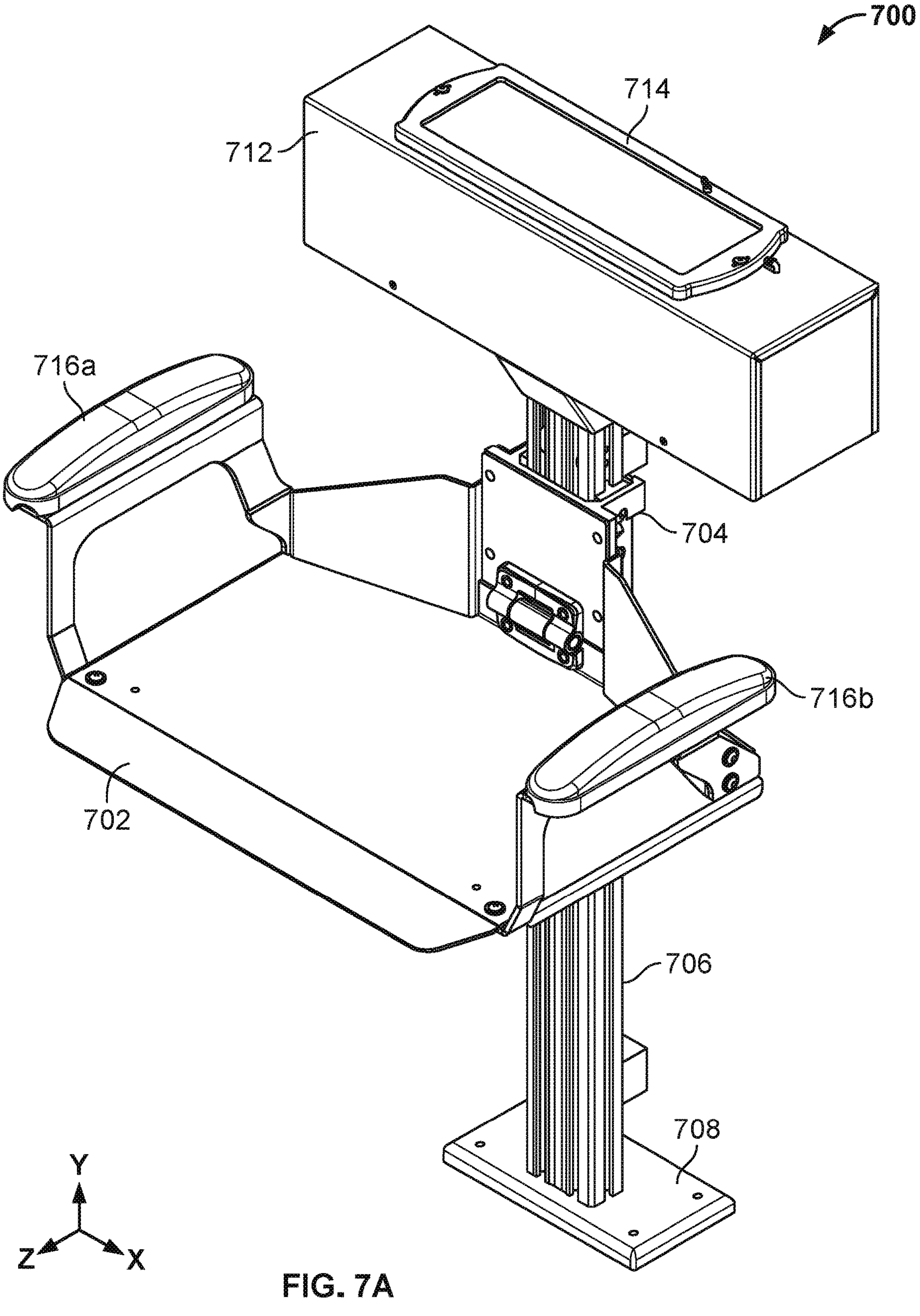
FIG. 7A is a block diagram illustrating in perspective view an embodiment of a stationary lift apparatus.

FIG. 7A is a block diagram illustrating in perspective view an embodiment of a stationary lift apparatus. In the example shown, lift apparatus 700 includes a seat 702 mounted to a linear bearing 704. Linear bearing 704 is coupled around vertical rail 706 in a manner that allows linear bearing 704, and seat 702 attached thereto, to be moved up and down along vertical rail 706. In this example, the vertical rail 706 may be constructed from extruded aluminum. In the example shown, vertical rail 706 includes a number of slots or grooves into which corresponding portions of linear bearing 704 extend and along and through which such portions of linear bearing 704 travel (e.g., slide) as linear bearing 704 moves up and/or down along vertical rail 706.

Vertical rail 706 is mounted fixedly to baseplate 708, which includes holes through which bolts or other fasteners may extend to bolt the lift apparatus 700 to a floor or other substrate.

A drive assembly 712 provides driving force to move linear bearing 704, and seat 702 attached thereto, along vertical rail 706, e.g., using cables (not shown in FIG. 7A). Solar cell(s) 714 generate electricity to recharge a battery comprising drive assembly 712.

In this example, seat 702 includes a front lip, as in the examples shown in FIG. 3, to enable a person to more readily slide onto the seat 702 from the floor when the seat 702 is in the lowered position. Seat 702 is attached to linear bearing 704 by a spring or tension-loaded hinge, as in the example shown in FIGS. 5A and 5B. Finally, seat 702 has attached thereto a pair of arm rests 716*a* and 716*b*, which in various embodiments may be removable and/or at least partly movable.

Figure 7B:
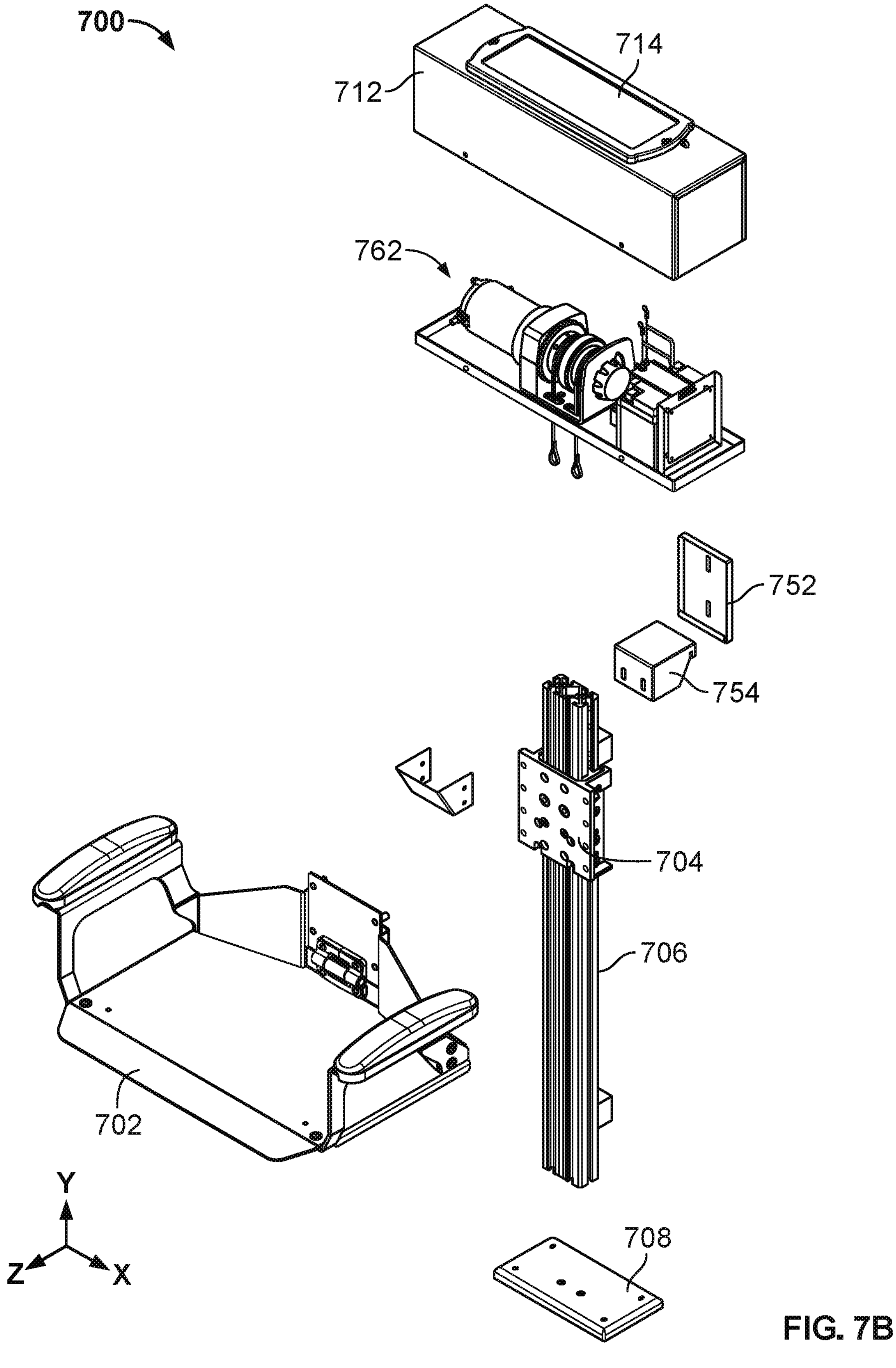
FIG. 7B is a block diagram illustrating in exploded view an embodiment of a stationary lift apparatus.

FIG. 7B is a block diagram illustrating in exploded view an embodiment of a stationary lift apparatus. In the example shown, lift apparatus 700 of FIG. 7A is shown to include in addition to the elements shown in FIG. 7A and described above a wall plate 752 to mount the lift apparatus 700 along a wall, e.g., at a wall stud, and a corresponding bracket 754 to secure an upper end of vertical rail 706 to the wall plate 752. In addition, drive assembly 712 is shown include a drive mechanism 762, which includes in this example a motor (left end), a winch drum and cables (center), and a battery/power supply (right end), along with peripheral and control elements.

Figure 8A:
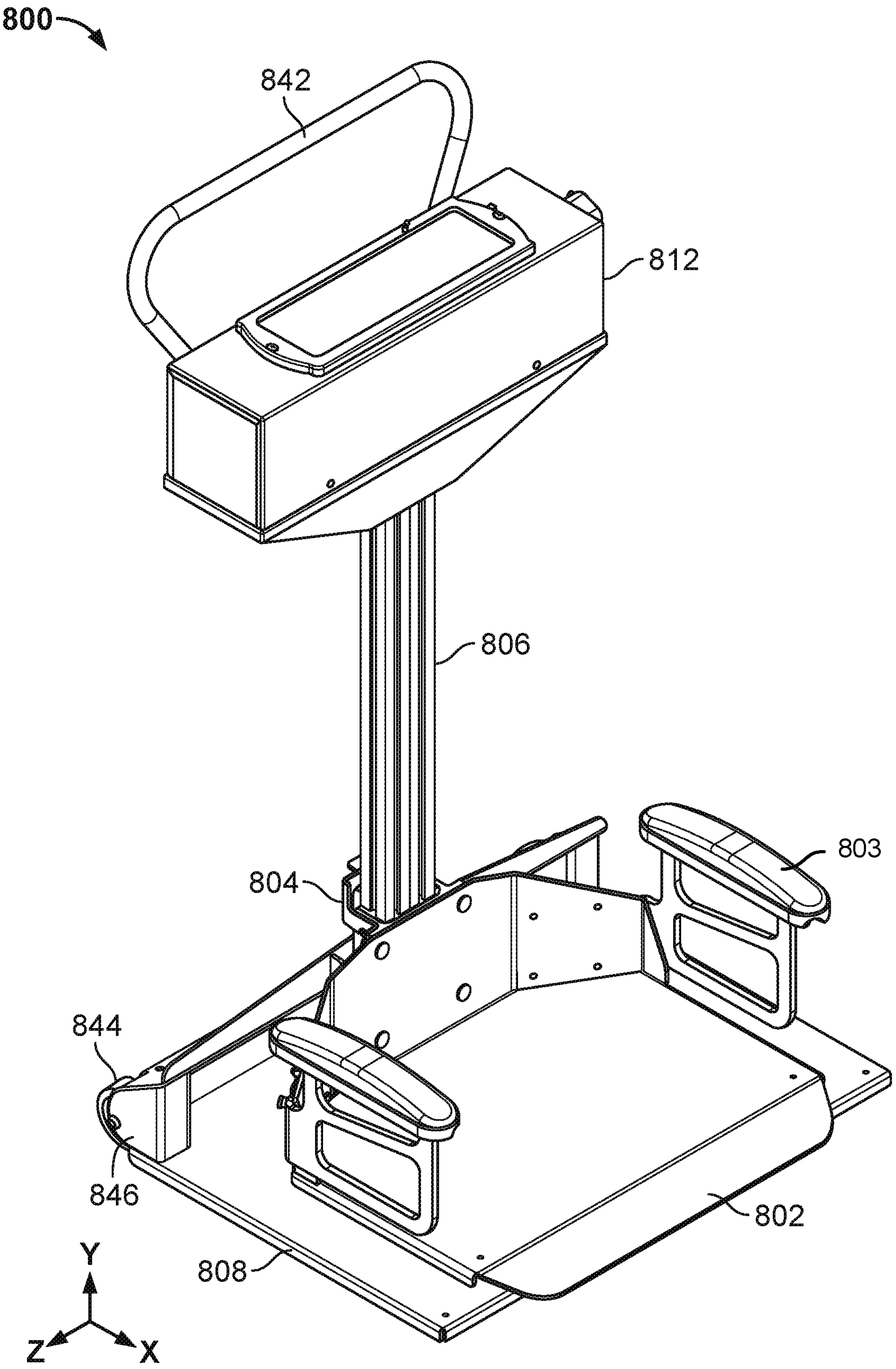
FIG. 8A is a block diagram illustrating in perspective view an embodiment of a portable lift apparatus.

FIG. 8A is a block diagram illustrating in perspective view an embodiment of a portable lift apparatus. In the example shown, the lift apparatus 800 includes a seat 802 having side handles 803, which prevent a human subject from sliding of the side of seat 802 and may be used as an arm rest for comfort. The seat 802 is mounted on a linear bearing 804 configured to move up and/or down along a vertical rail 806. The vertical rail 806 is attached to a moveable base plate 808. A drive assembly 812 provides a driving force to move the linear bearing 804 along the vertical rail 806. The lift apparatus 800 includes a handle 842 affixed to the housing of drive assembly 812. In addition, on each side of a rear edge of baseplate 808, a wheel (or roller) 844 is affixed to the baseplate via a bracket (flange, etc.) 846. As in the example shown in FIG. 6, the lift apparatus 800 may be moved in various embodiments by using handle 842 to rock the lift apparatus back onto wheels 844 and using the handle 842 to push the lift apparatus 800, while balanced on wheels 844, to a desired location.

Figure 8B:
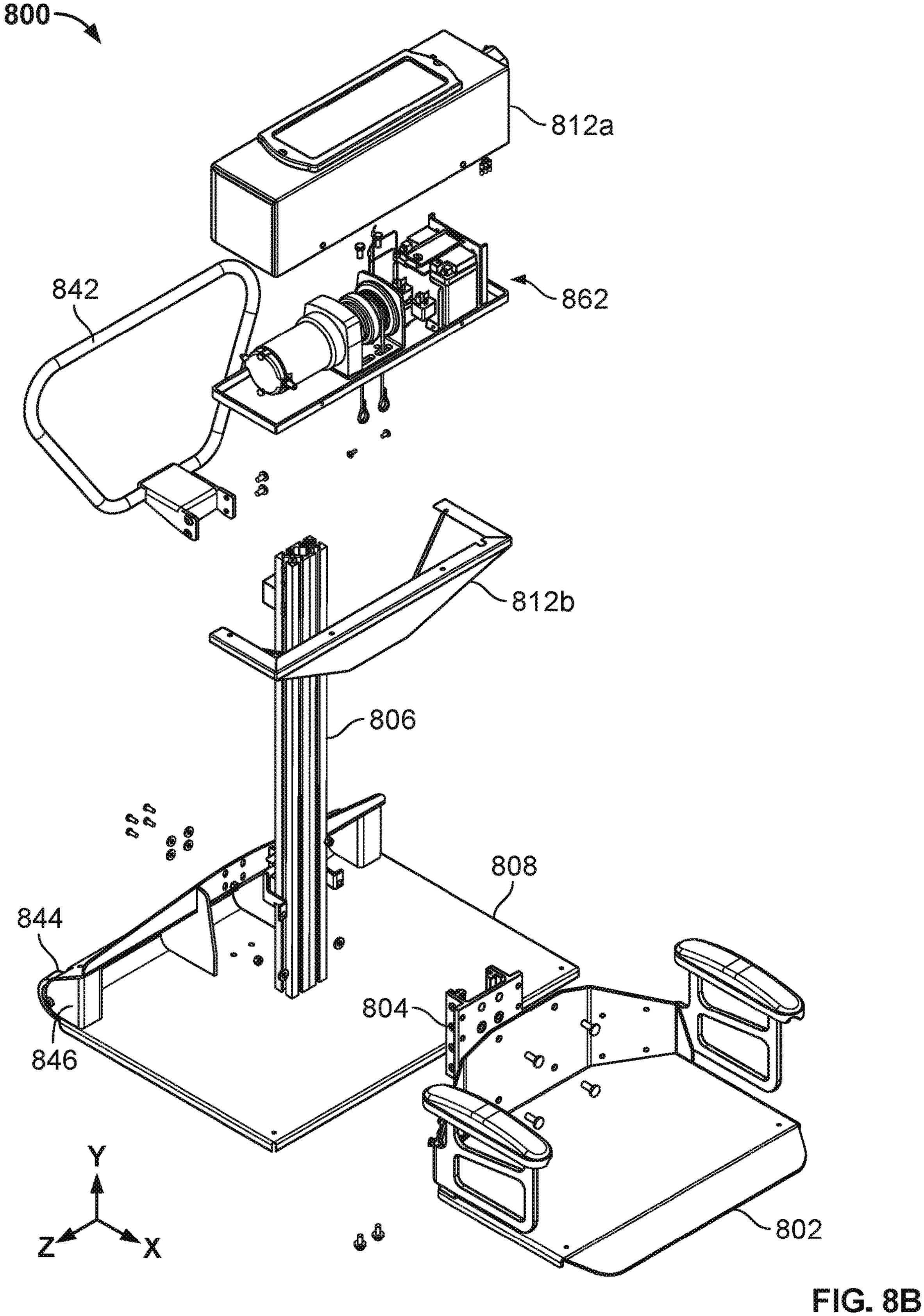
FIG. 8B is a block diagram illustrating in exploded view an embodiment of a portable lift apparatus.

FIG. 8B is a block diagram illustrating in exploded view an embodiment of a portable lift apparatus. In the example shown, drive assembly 812 of lift apparatus 800 is shown to include an upper housing portion 812*a* and a lower housing portion 812*b*. Handle 842 attaches to the apparatus at vertical rail 806. In addition, drive assembly 812 includes a drive mechanism 862 that includes components and functionality similar to those described above in connection with drive mechanism 762 of FIG. 7B.

In various embodiments, a lift apparatus as disclosed herein may include and/or comprise one or more of the following:

1) Self or assisted operated lift apparatus to raise a human user from the within 2 inches of the floor to a height of 17" to 19", as defined by the ADA for seating, to allow the most energy and muscle efficient procedure to achieve a standing position or standing up. The apparatus may include human-engineered features for lift safety and post-lift supports for the standing process.
2) Self or assisted operated lift apparatus to transfer a human from a wheel chair, commode or other device from a height of 16" to 20" above the floor to within 2 inches of the floor.
3) A specially designed lift seat with fixed or folding hand rails engineered with optimum placement, for the most efficient and safest mount and dismount from either the raised or lowered position and for transfers from other sitting apparatus like a wheelchair, commode or other fixture or device.
4) A specially designed lift seat with fixed or adjustable-width hand rails engineered with optimum placement, while being adjustable in equivalent distances on both sides of the primary seat to meet the needs of a plethora of different body sizes and shapes.
5) Adjustable lift-height-stop points between 10 and 30 inches allow flexibility for specific disabilities and physical anomalies as required by the mobility needs of the individual disability/user. Adjustable-on-installation stop height, customizable lift seat, lift activation mechanisms and other customizations are applicable variations for individual physical anomalies related to birth defects and the victims of accidents, amputees etc.

Floor or Seated to Standing Lift

A lift device to lift a human subject from a floor, seated, or other non-standing position to a standing position is disclosed. In various embodiments, the seat of the human lift as disclosed herein is configured to rotate (tip) forward, to facilitate the user transitioning from a seated to standing position. In some embodiments, the rotating (i.e., tipping forward, by rotating about an axis parallel to the ground, is passive in operation. In some embodiments, the seat plate is configured to rotate up to 30 degrees toward the front allowing the hips upper legs to align as the person is lifted to standing.

In some embodiments, the seat plate is positioned such the axis of rotation is set away from the column/post to which the seat is attached at the rear edge, e.g., via a bracket, for lifting via a motor-driven linear bearing or other liner drive mechanism, allowing the lift action to assist in the alignment of the hips with the upper leg joints, e.g., as the seat rises above the seated height and the user begins to transfer weight to the user's feet as the user transitions to the standing position. For example, the axis of rotation may be parallel to the ground, running crosswise from one side of the seat to the other, and position a distance from the rear and front edges, e.g., approximately below or just in front of where the user's hips may be positioned when seated on the seat plate.

In various embodiments, the seat assembly includes one or more of a seat cover, seat foundation, hinge assemblies, and a structure that returns the seat to an orientation parallel to the floor, e.g., once a user transitions to a standing position and the user's weight is no longer on the front (tipped down) part of the seat. In some embodiments, the mechanism to return the seat to the orientation parallel to the ground and/or to provide resistance to control the speed or extent of the seat rotating (tipping) forward includes two pressurized gas struts. The gas struts provide back pressure for a seat return-to-flat function and detente for smooth, silent operation. In some alternative embodiments, a dual action spring detent/return mechanism (e.g., basic springs, spring-loaded hinges etc.) is used. In some embodiments, the rotating angle can be set to one of a plurality of maximum seat rotation (tipping) angles, with multiple detent options for varying disabilities, for example.

In some embodiments, the seat rotates around an axis that runs cross-wise across the seat (e.g., substantially parallel to the front and back edges of the seat) at approximately the same perpendicular distance from the front and rear edges of the seat, such that a person seated more fully back on the seat will have the persons center of gravity at or near the rotational axis, resulting in the seat not rotating (tipping) forward when the person is seated more fully back onto the seat. As the seat raises to and then past the seated height, via the lifting mechanism (e.g., motor-driven linear bearing), if the person slides forward in the seat and places their feet on the ground the seat rotates (tips) forward, to an increasing degree (e.g., up to 30 degrees off parallel) as the person slides forward and off the seat when the seat continues to rise and the person shifts their weight increasingly to the feet as they transition to a standing position. Once the person is standing and clear of the seat, the seat returns to an orientation parallel to the floor, e.g., via springs, gas struts, or another mechanism.

In some embodiments, an automatically activated interlock or other mechanism prevents seat rotation unless/until the seat is raised to at or above the ADA or other seated height. In some embodiments, a lever operated or other manually operated lock is provided and may be used to prevent rotation while the lock is engaged and allow rotation, as described above, only when the lock is disengaged.

In various embodiments, the assist handles on either side of the seat have been lengthened by 4 inches from the example embodiments shown in FIGS. 7A (arm rests **716*a* and 716*b*) and 8A (handles 803**) above, which provides two main functions:

1) When scooting onto the beveled seat, the user naturally grabs the assist handles. Making them 4 inches longer causes the weight of the user to be placed on the machine through the handles as the user tries to scoot rearward which stops the lift from slipping rearward as the user mounts the machine. This is huge for those that have more severe disabilities and want to maintain their independence.
2) The extra length assists with transfers from or to a wheelchair, a bed, the toilet, etc.

FIGS. 9A through 9E illustrate an embodiment of a floor-to-standing lift apparatus. In the example shown, lift apparatus 900 includes a seat 902 tiltably mounted via a support 904 to a carriage 906 configured to be raise/lowered along a guide rail or post 908, e.g., via an electrical motor, powered linear bearing, electrical motor-driven cable or chain, or other motive force. In the state shown in FIG. 9A, the seat 902 is near the floor and a human subject 910 has position themself on the seat 902, as shown.

Figure 9A:
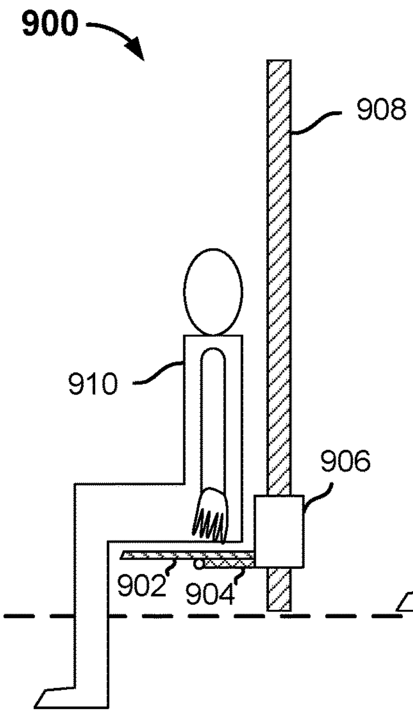
FIGS. 9A through 9E illustrate an embodiment of a floor-to-standing lift apparatus.
Figure 9B:
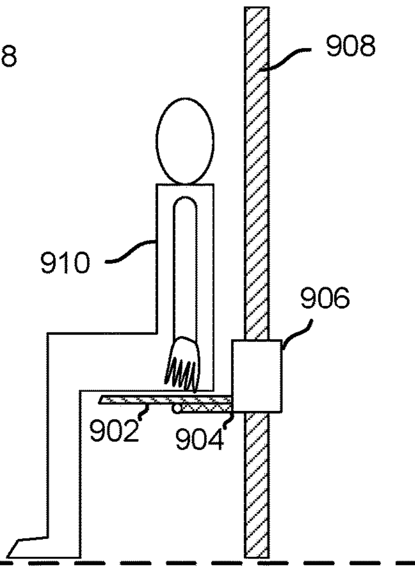

FIG. 9B shows the same human subject 910 seated in seat 902, which in the state shown in FIG. 9B has been raised to a height associated with a seated position. In the positions shown in FIGS. 9A and 9B, the center of gravity of the human subject may be located between the tilt axis of the seat 902 and the back edge of the seat 902, nearest guide rail or post 908, resulting in the seat 902 not tilting. In some embodiments, a seat lock is provided and may be used to further prevent tilting of the seat during lifting from the floor to the height associated with a seated position, as in FIGS. 9A and 9B.

Figure 9C:
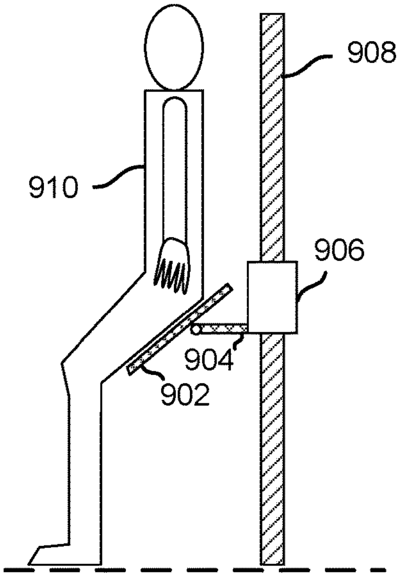

In FIG. 9C, the seat 902 has been raised above the height associated with the seated position. In the state shown, the seat 902 is shown to have been tilted forward, e.g., by rotating about a transverse tilt axis (i.e., one that runs crosswise across the seat 902, from one side to the other, substantially parallel to the front and rear edges of seat 902) at which the seat 902 is tiltably mounted to the support 904. The continued upward motion of the seat 902 assists the human subject 910 in beginning to transition to a standing position, as shown in FIG. 9C, and the tilting forward of the seat 902 facilitates the human subject 910 in sliding forward and off the seat 902, while continue to be supported and prevented from falling back, for example, as the seat 902 continues to be raised and the human subject 910 endeavors to rise to a full standing position. In various embodiments, the seat 902 tilts as shown in FIG. 9C in response to the center of gravity of the human subject being moved to a position forward of the tilt axis, e.g., by the subject and/or an assistant sliding the subject forward, towards the front edge of seat 902.

Figure 9D:
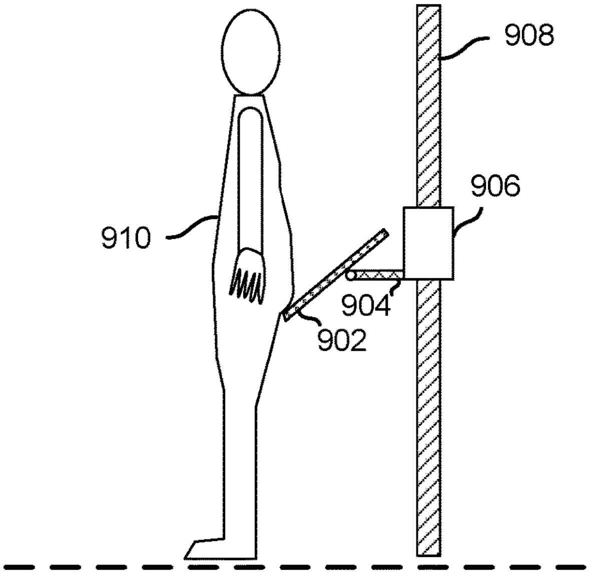
Figure 9E:
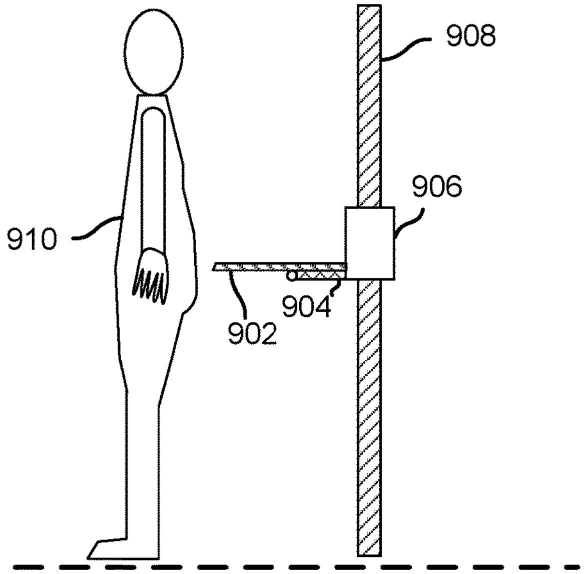

FIG. 9D shows the seat 902 raised even further, as compared to FIG. 9C, and shows the human subject in a fully standing position. As shown in FIG. 9E, as the human subject 910 moves forward and away from the lift 900, the seat 902 returns to a position substantially parallel to the floor. In various embodiments, the seat 902 is returned to the position shown in FIG. 9E by one or more of a gas strut, a spring, or another structure configured and positioned to return the seat 902 to the position shown in FIG. 9E.

Figure 10A:
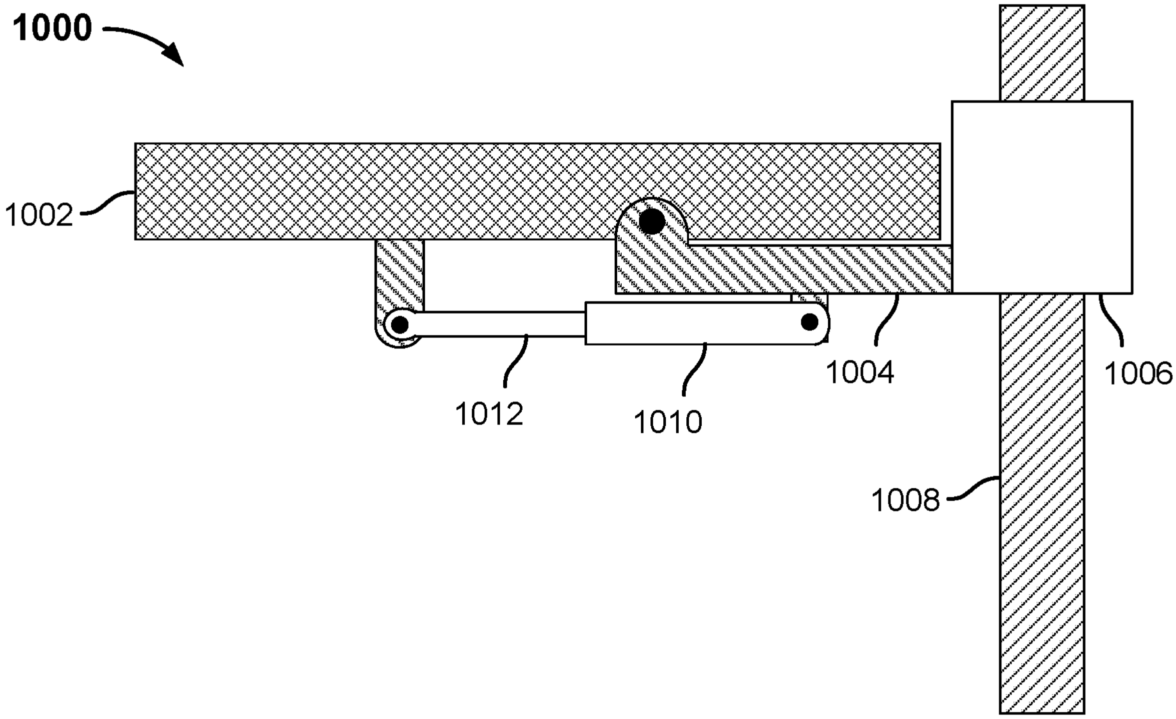
FIG. 10A is a diagram illustrating an embodiment of a seat and associated tilting mechanism in an embodiment of a floor-to-standing lift apparatus.

FIG. 10A is a diagram illustrating an embodiment of a seat and associated tilting mechanism in an embodiment of a floor-to-standing lift apparatus. In the example shown, tiltable seat assembly 1000 includes a seat 1002 attached via a support 1004 to a carriage 1006 configured to be moved under a motive force to raise/lower seat assembly 1000 along a guide rail or post 1008. A gas strut or "gas spring" comprising a cylinder 1010 and piston rod 1012 is connected at the cylinder 1010 end to the support 1004 and at the piston rod 1012 end to the seat 1002.

Figure 10B:
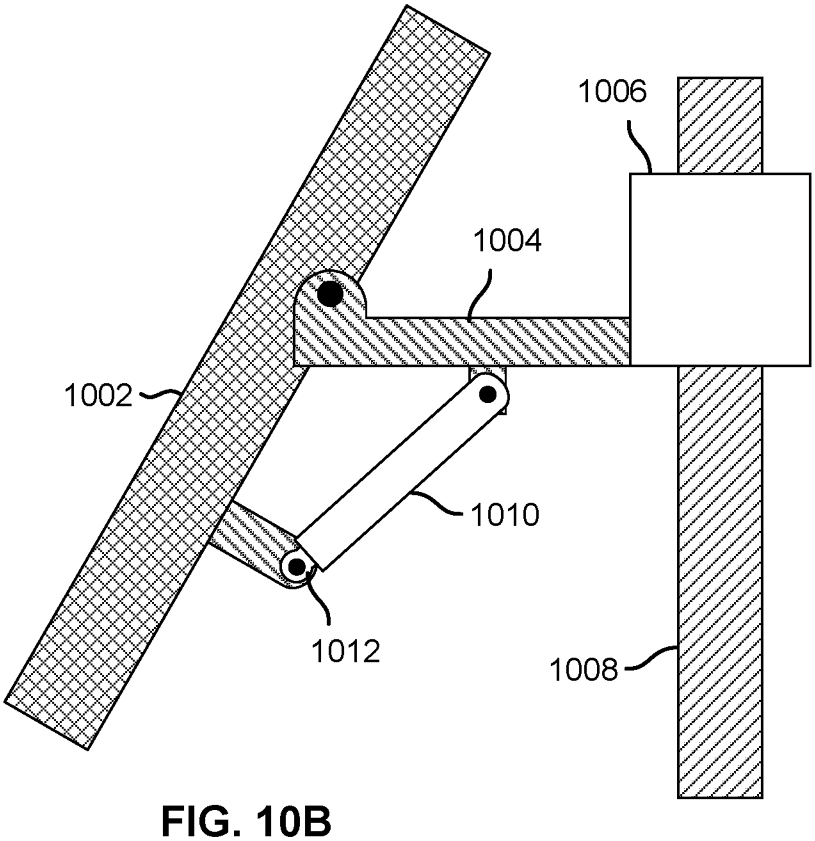
FIG. 10B is a diagram illustrating the seat and associated tilting mechanism of FIG. 10A in a tilted position.

FIG. 10B is a diagram illustrating the seat and associated tilting mechanism of FIG. 10A in a tilted position. In the state shown in FIG. 10B, the seat 1002 is tilted forward, e.g., as in FIGS. 9C and 9D. In this example, the gas strut 1010, 1012 is configured as a compression spring, which provides dampening as the seat 1002 tilts forward, e.g., to the position shown in FIG. 10B, forcing the piston rod 1012 into the cylinder 1010 and compressing a pneumatic fluid in the cylinder 1010, such as nitrogen gas, thereby generating an extension force tending to push the rod 1012 out of the cylinder 1010. For example, when the weight of a human subject is removed, as in FIG. 9E, the extension force returns the seat 1002 from the position shown in FIG. 10B to the position shown in FIG. 10A. In various embodiments, the gas strut 1010, 1012 returns the seat to the position shown in FIG. 10A in a controlled motion, which reduces the risk of the seat edge swinging up too quickly and possibly contacting the human subject.

Figure 11A:
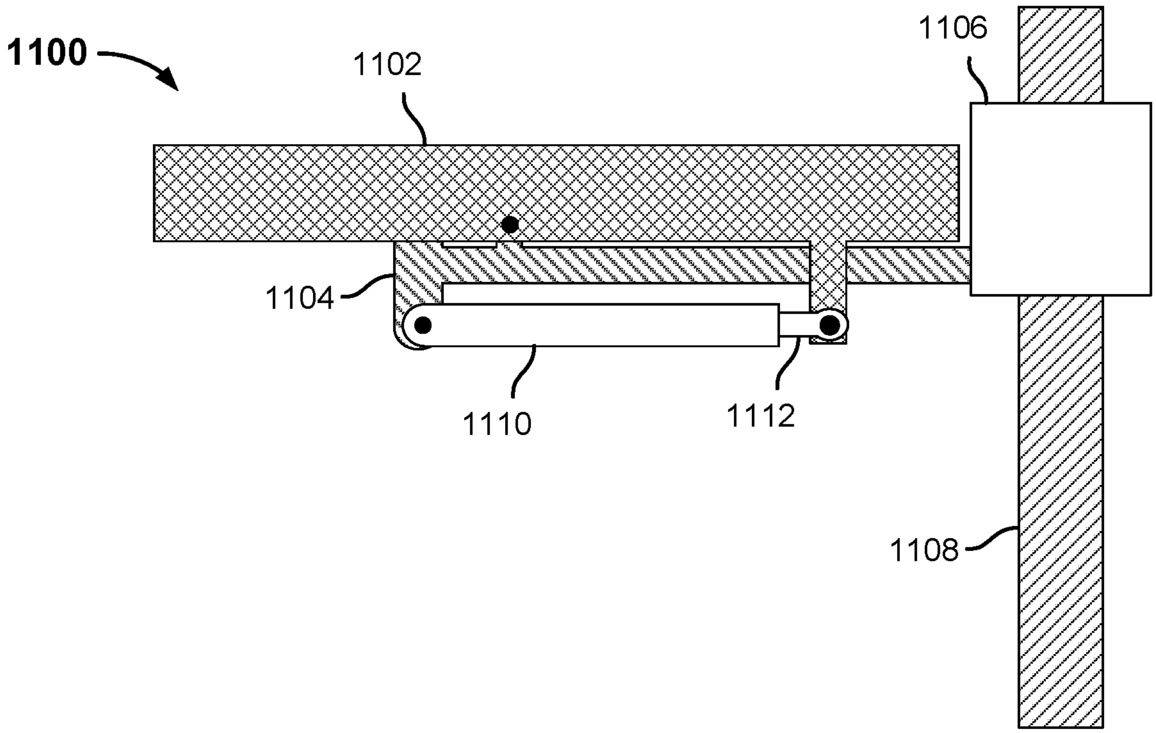
FIG. 11A is a diagram illustrating an embodiment of a seat and associated tilting mechanism in an embodiment of a floor-to-standing lift apparatus.

FIG. 11A is a diagram illustrating an embodiment of a seat and associated tilting mechanism in an embodiment of a floor-to-standing lift apparatus. In the example shown, tiltable seat assembly 1100 includes a seat 1102 tiltably mounted via support 1104 to carriage 1106 configured to be moved under a motive force to raise/lower seat assembly 1100 along a guide rail or post 1108. A gas strut or "gas spring" comprising a cylinder 1110 and piston rod 1112 is connected at the cylinder 1110 end to the support 1004 and at the piston rod 1112 end to the seat 1102.

Figure 11B:
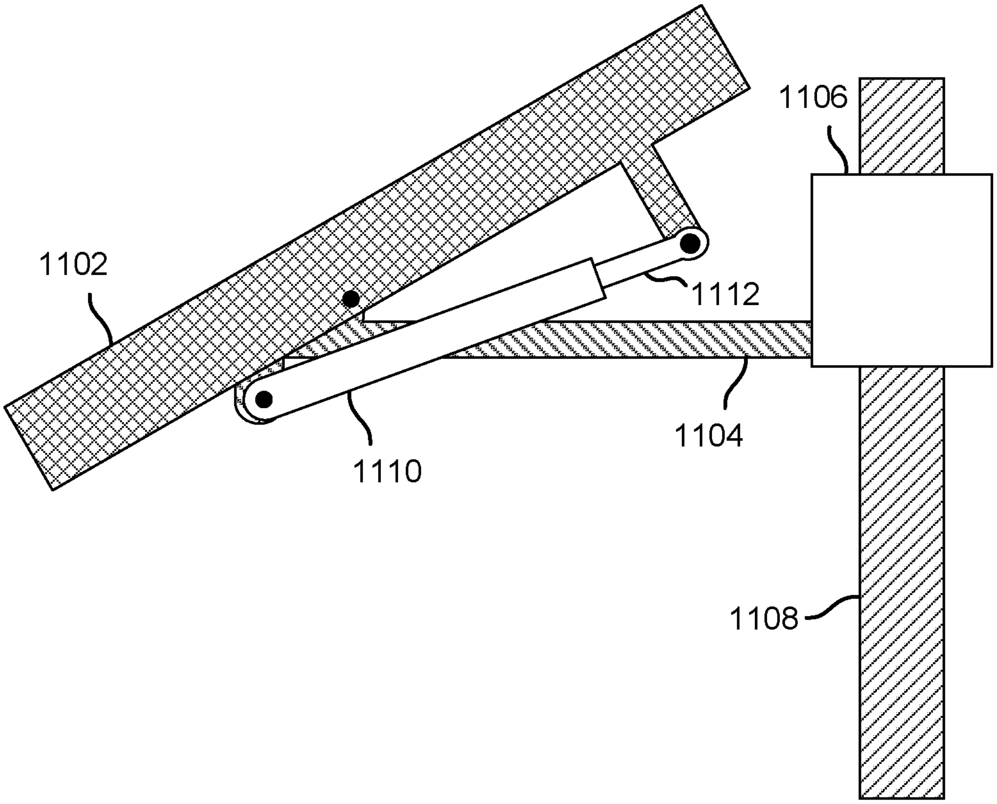
FIG. 11B is a diagram illustrating the seat and associated tilting mechanism of FIG. 11A in a tilted position.

FIG. 11B is a diagram illustrating the seat and associated tilting mechanism of FIG. 11A in a tilted position. In the state shown in FIG. 11, the seat 1102 is tilted forward, e.g., as in FIGS. 9C and 9D. In this example, the gas strut 1110, 1112 is configured as a tension spring, which provides dampening as the seat 1102 tilts forward, e.g., to the position shown in FIG. 11B, pulling the piston rod 1112 (further) out of the cylinder 1110 and compressing a pneumatic fluid in the cylinder 1110, such as nitrogen gas, thereby generating tension or "pull-in" force tending to pull the rod 1112 back/further into the cylinder 1110. For example, when the weight of a human subject is removed, as in FIG. 9E, the pull-in force returns the seat 1102 from the position shown in FIG. 11B to the position shown in FIG. 11A.

Figure 12:
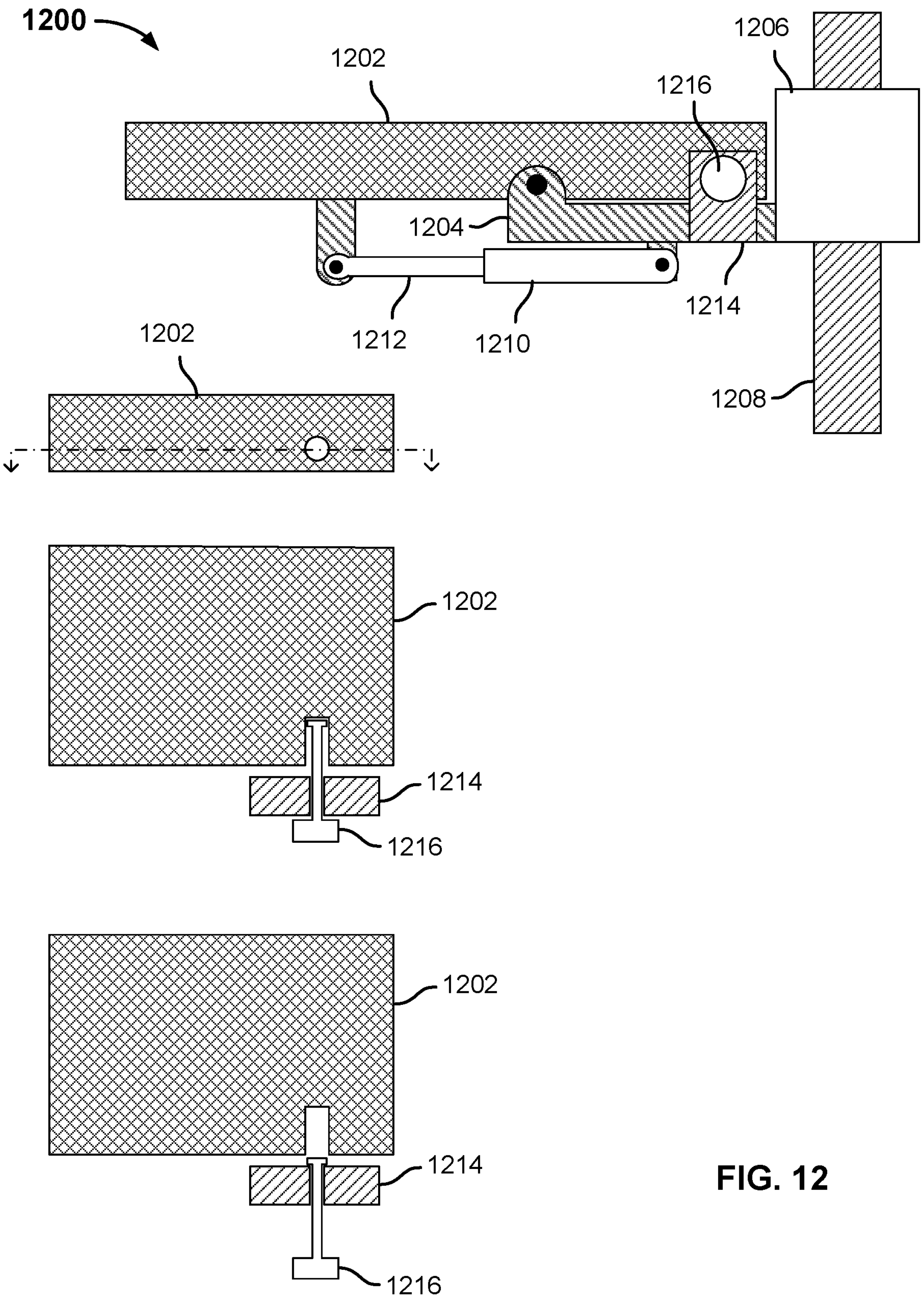
FIG. 12 is a diagram illustrating an embodiment of a seat tilt locking mechanism in an embodiment of a floor-to-standing lift apparatus.

FIG. 12 is a diagram illustrating an embodiment of a seat tilt locking mechanism in an embodiment of a floor-to-standing lift apparatus. In the example shown, tiltable seat assembly 1200 includes a seat 1202 tiltably mounted via a support 1204 to a carriage 1206 configured to raise/lower the seat assembly 1200 along a guide rail or post 1208. A gas strut comprising cylinder 1210 and piston rod 1212 provides damping and a force to return the seat 1200 to the position shown. To avoid unintended tilting of seat 1202, e.g., in an operation in which a human subject is not attempting to be lifted to a standing position and/or increased safety and stability is desired for whatever reason, the seat assembly 1200 in this example includes a seat locking mechanism comprising a guide 1214 fixedly attached to support 1204 and a locking pin 1216 configured to slide through a corresponding cylindrical hole that extends through the guide 1214. As shown in the cut out top views in the bottom left of FIG. 12, when the pin 1216 is inserted through guide 1214 and into a corresponding recess in the side of seat 1202, the seat 1202 is locked in position and prevented from tilting. By contrast, when the pin 1216 is pulled out through the guide 1214, the opposite end of pin 1216 is withdrawn from the corresponding hole in the side of seat 1202 and the seat 1202 is unlocked and free to tilt forward, e.g., as described above.

Figures 13A, 13B:
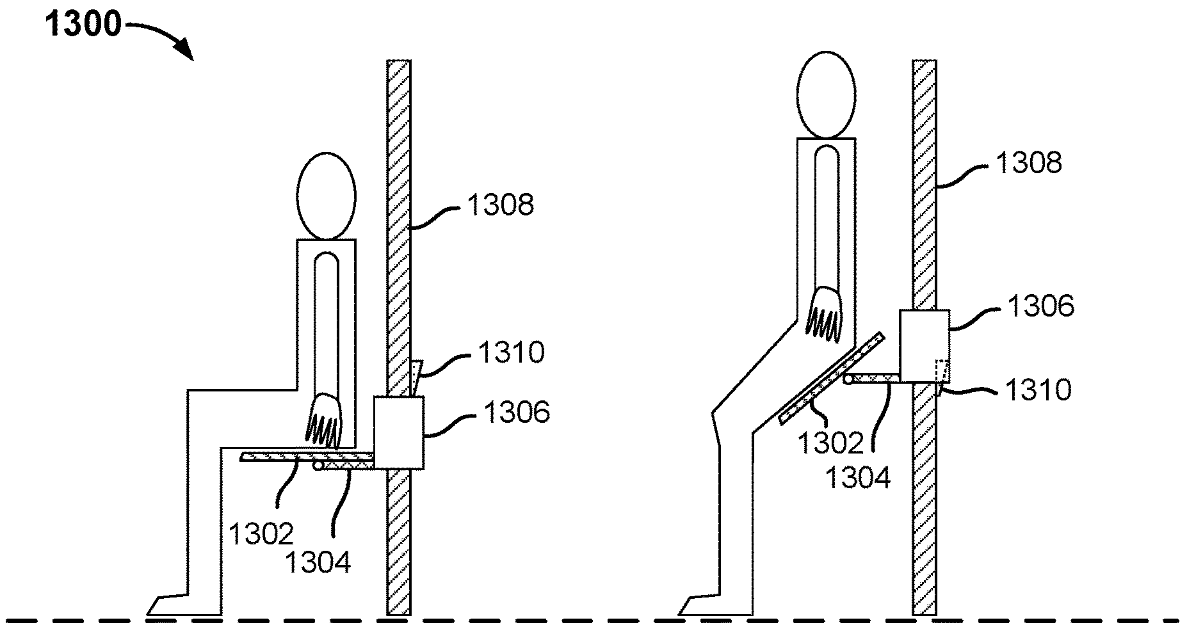
FIGS. 13A and 13B illustrate an embodiment of a floor-to-standing lift apparatus with a self-actuating seat tilt locking and unlocking mechanism.

FIGS. 13A and 13B illustrate an embodiment of a floor-to-standing lift apparatus with a self-actuating seat tilt locking and unlocking mechanism. In the example shown, the lift 1300 includes a seat 1302 tiltably mounted via a support 1304 to a carriage 1306 configured to be used to raise/lower the seat 1302 along a guide rail or post 1308. In this example, a sensor or other actuator 1310 is positioned along guide rail or post 1308 at a height associated with a seated position. The seat 1302 remains locked and unable to tilt when the carriage 1306 is in a position lower than the sensor/actuator 1310. As the carriage 1306 reaches and rises above the sensor/actuator 1310, as shown in FIG. 13B, the seat 1302 is unlocked, automatically without intervention by the human user, and is able to tilt forward as the seat 1302 continues to rise.

In some embodiments, the sensors/actuator 1310 comprises a limit switch or other sensor. Upon activation, a responsive circuit unlocks the seat 1302. For example, an electric signal may be sent to a solenoid configured to pull a plunger out of a recess or hole in the side of the seat 1302, making it able to be moved/tilted. In some embodiments, sensors/actuator 1310 comprises and/or actuates a mechanical interlock. The upward motion of the carriage 1306 engages and activates the interlock 1310, unlocking the seat 1302.

Figure 14A:
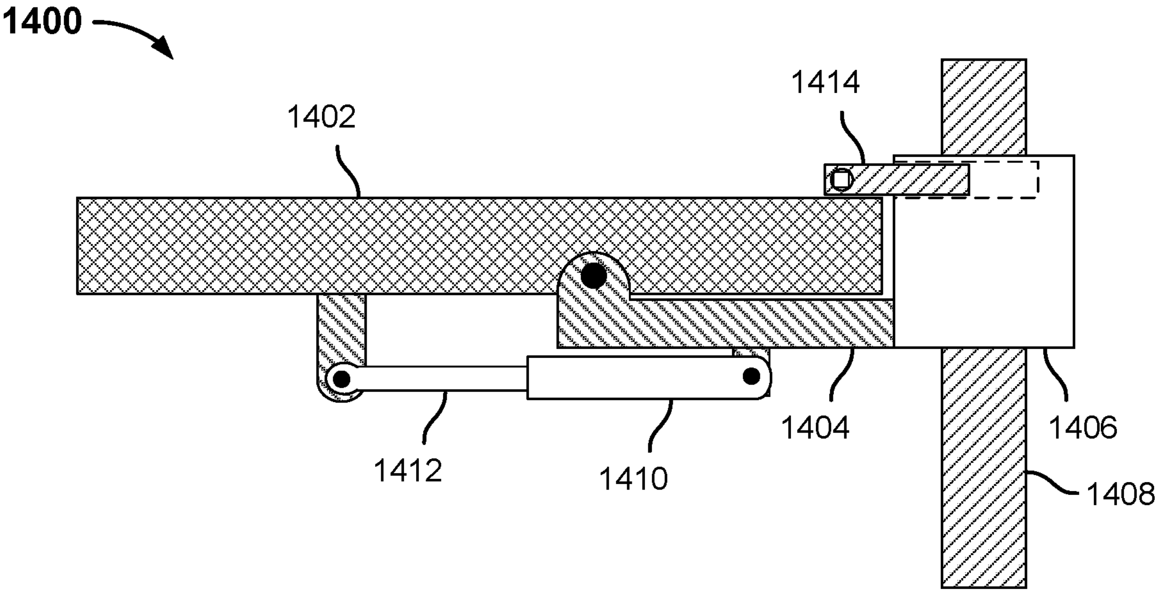
FIGS. 14A and 14B illustrate an embodiment of a seat tilt locking mechanism in an embodiment of a floor-to-standing lift apparatus.
Figure 14B:
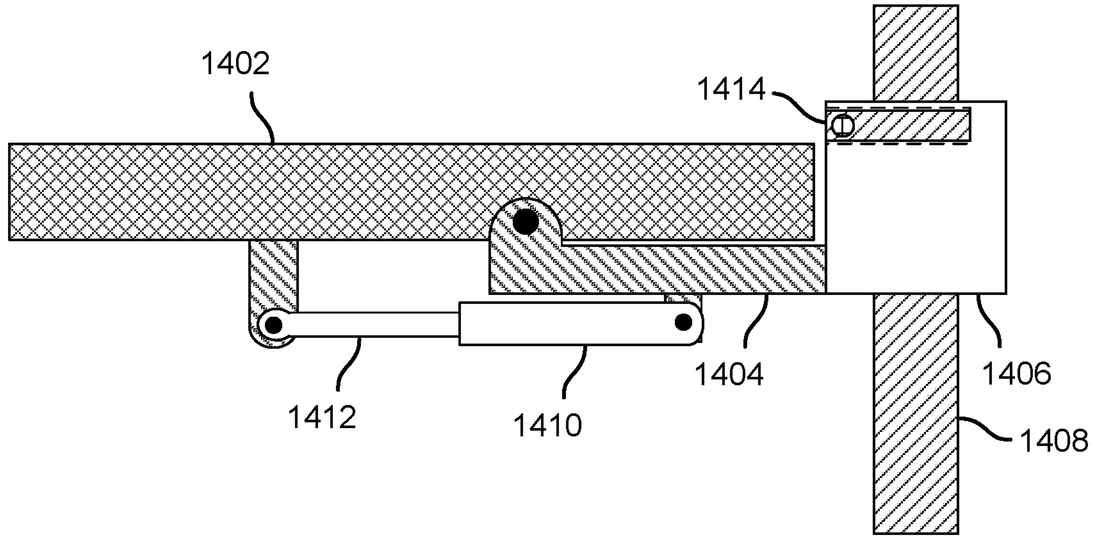

FIGS. 14A and 14B illustrate an embodiment of a seat tilt locking mechanism in an embodiment of a floor-to-standing lift apparatus. In the example shown, seat assembly 1400 includes a seat 1402 tiltably mounted via a support 1404 to carriage 1406 configured to raise/lower the seat assembly 1400 along a guide rail or post 1408. A gas strut comprising cylinder 1410 and piston rod 1412 provides dampening as the seat 1402 is tilted forward and applies a force to return the seat 1402 to the position shown, e.g., once a human subject has been lifted to a standing position and is no longer in contact with the seat 1402. In the example shown, the seat assembly 1400 includes a seat locking mechanism comprising a shaft or pin 1414 slid able mounted on a side of carriage 1406. In the position shown in FIG. 14A, the shaft or pin 1414 has been slid forward to a position that locks the seat 1402 in position, preventing the seat 1402 from tilting forward. In FIG. 14B, the shaft or pin 1414 has been slid to the unlocked position, such that the seat 1402 is unlocked and free to tilt forward.

Figure 15:
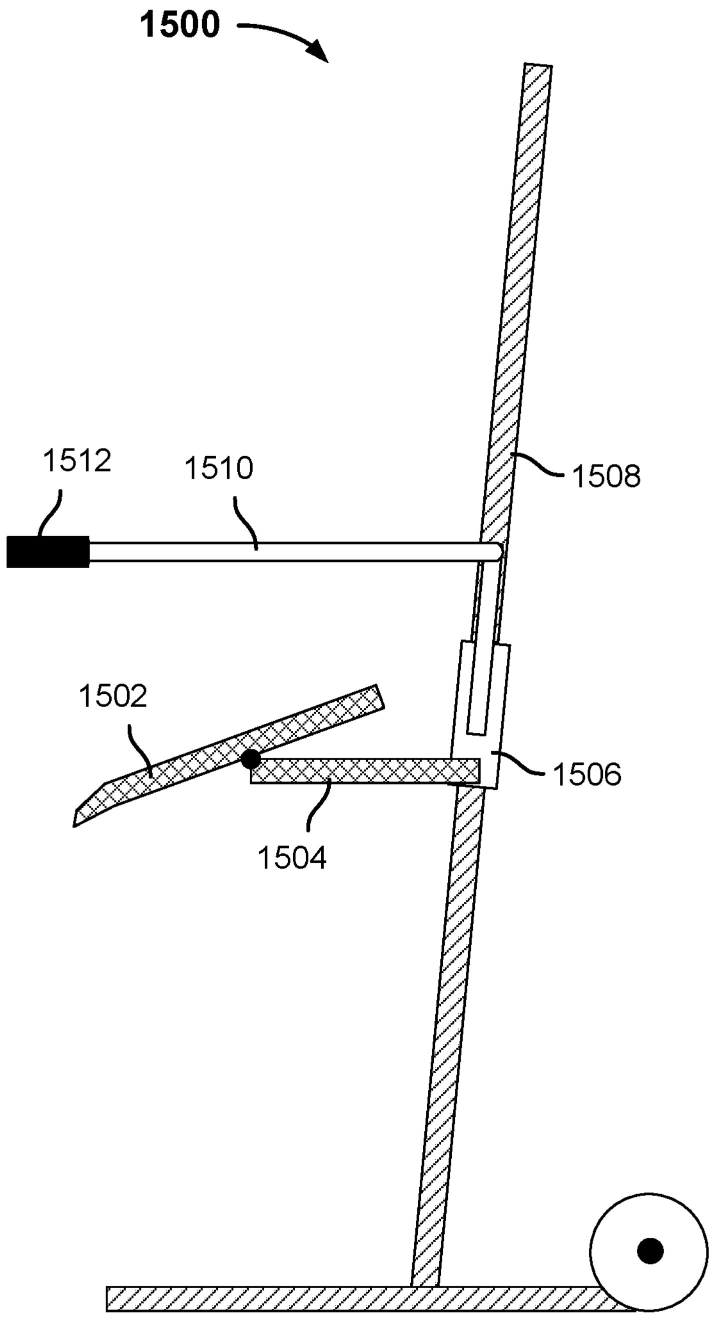
FIG. 15 illustrates an embodiment of a floor-to-standing lift apparatus with extended handrails.

FIG. 15 illustrates an embodiment of a floor-to-standing lift apparatus with extended handrails. In the example shown, lift 1500 includes a seat 1502 tiltably mounted via a support 1504 to a carriage 1506 configured to raise/lower the seat 1502 along guide rail or post 1508. The lift 1500 includes a pair of handrails 1510 that extend upward and outward from the carriage 1506 and bend around to run alongside the seat 1502 and extend forward of a front edge (left side as shown) of seat 1502, terminating in this example in a hand grip 1512. In various embodiments, the handrails 1510 extend forward of the front edge of the seat 1502, enabling the handrails to be used to provide support as a human subject slides onto the seat 1502, e.g., from the floor, and also to provide support as the human subject is raised to a standing position and pushes themself up to the standing position and moves forward away from the lift 1500, as illustrated in FIGS. 9A through 9E.

In some embodiments, the handrail 1510 is removably mounted to the carriage 1506. For example, a human subject or an assistant may remove the handle 1510 for more compact storage or to make it easier for a human subject to slide from the floor onto the seat 1502.

In some embodiments, a human floor lift as disclosed herein, such as lift 1500, may be used to raise a human subject that is in a standing position. The subject stands on the seat, e.g., seat 1502, when the seat has been lowered to the ground. The lift 1500 raises the standing human subject above the ground, e.g., to a height that enables the human subject to move into a seated position on a medical examination or treatment bed or bench, such as a bench on which a patient lies to conduct a medical procedure, a bench comprising a medical diagnostic or treatment equipment, such as an Mill, etc. In some embodiments, extended handrails such as handrail 1510 of FIG. 15 provide increased safety and stability as the human subject transitions from the lift 1500 to the bed or bench, for example.

In various embodiments, the disclosed apparatus may enable elderly and disabled persons who are relatively mobile yet unable to get up from the floor without assistance to lift themselves off the floor and to a position from which they may be able to stand, for example in the event of a fall to the floor. In various embodiments, a human lift as disclosed herein enables a user to transition from the floor to a seated position, from a seated position or any other height above the floor to a standing position (or down to the floor), and/or from the floor to a standing position (or from standing or seated to floor).

A self-operated lift apparatus as disclosed herein may be installed in various embodiments in a fixed location for the individual living alone or a portable apparatus in some embodiments may be used by someone living with a companion or assistant that would be able to place the lift directly where it is needed when they are unable to lift the other individual off of the floor without outside assistance.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A human lift apparatus, comprising:

a substantially vertical guide rail;

a carriage positioned to be moved up and down along the guide rail;

a drive mechanism coupled to the carriage and configured to move the carriage at a controlled rate along the guide rail;

a tiltable seat coupled mechanically to the carriage in a manner that allows the seat to tilt about a substantially transverse tilt axis that is substantially parallel to the floor and runs substantially across the seat at a depth that enables a human subject to be seated on the tiltable seat with the center of gravity of the human subject being between the tilt axis and a back end of the seat;

wherein the tiltable seat is tiltably mounted in a manner and location that allows the tiltable seat to tilt down, with a front edge of the seat lower than the back edge of the seat, as the center of gravity of the human subject is shifted to a position forward of the tilt axis; and a seat locking mechanism that prevents the tiltable seat from tilting, wherein the seat locking mechanism comprises a mechanical seat lock.

2. The human lift apparatus of claim 1, further comprising a return mechanism configured to return the seat to a non-tilted position.

3. The human lift apparatus of claim 2, wherein the return mechanism comprises a gas strut configured to return the seat to a non-tilted position.

4. The human lift apparatus of claim 3, wherein the return mechanism is configured to dampen motion of the seat as it returns the seat to a non-tilted position.

5. The human lift apparatus of claim 4, wherein the return mechanism is configured to dampen motion of the seat as it tilts into a tilted position.

6. The human lift apparatus of claim 2, wherein the return mechanism comprises a spring configured to return the seat to a non-tilted position.

7. The human lift apparatus of claim 1, wherein the seat is constructed at least in part of a substantially rigid material, having a size and shape suitable to accommodate a seated human occupant.

8. The human lift apparatus of claim 1, wherein the seat locking mechanism comprises a sliding shaft or pin.

9. The human lift apparatus of claim 1, wherein the seat locking mechanism is configured to become unlocked automatically as the seat is raised above a height associated with a seated position.

10. The human lift apparatus of claim 1, further comprises a handrail.

11. The human lift apparatus of claim 10, wherein the handrail mounts to the carriage.

12. The human lift apparatus of claim 11, wherein the handrail is removable.

13. The human lift apparatus of claim 10, wherein the handrail extends forwards past the front edge of the seat.

14. The human lift apparatus of claim 13, wherein the handrail extends approximately four inches beyond the front edge of the seat.

15. The human lift apparatus of claim 13, wherein the handrail extends at least four inches beyond the front edge of the seat.

* * * * *